United States Patent
Futaki et al.

(10) Patent No.: US 12,245,315 B2
(45) Date of Patent: Mar. 4, 2025

(54) RAN NODE, RADIO TERMINAL, AND METHODS THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 335 days.

(21) Appl. No.: 17/629,841

(22) PCT Filed: Nov. 30, 2020

(86) PCT No.: PCT/JP2020/044526
§ 371 (c)(1),
(2) Date: Jan. 25, 2022

(87) PCT Pub. No.: WO2021/161621
PCT Pub. Date: Aug. 19, 2021

(65) Prior Publication Data
US 2022/0287137 A1    Sep. 8, 2022

(30) Foreign Application Priority Data
Feb. 13, 2020  (JP) ................. 2020-022471

(51) Int. Cl.
*H04W 56/00*    (2009.01)
*H04L 5/00*    (2006.01)
(Continued)

(52) U.S. Cl.
CPC ........... *H04W 76/27* (2018.02); *H04L 5/0035* (2013.01); *H04W 92/10* (2013.01)

(58) Field of Classification Search
CPC ...... H04W 76/27; H04W 92/10; H05L 5/0035
(Continued)

(56) References Cited

U.S. PATENT DOCUMENTS 11,864,262 B2 *  1/2024  Liu ................. H04W 72/23
2020/0037210 A1  1/2020  Rugeland et al.
(Continued)

FOREIGN PATENT DOCUMENTS

WO    2018/142207 A1    8/2018
WO    2018/202148 A1    11/2018

OTHER PUBLICATIONS

"Zhang, Data Transmission Method, Device and Storage Medium, Sep. 16, 2020, EP 3709762" (Year: 2018).*
(Continued)

*Primary Examiner* — Sai Ming Chan
(74) *Attorney, Agent, or Firm* — Sughrue Mion, PLLC

(57) ABSTRACT

If uplink data together with an RRC resume request message is received from a radio terminal in an RRC_INACTIVE state and a radio terminal context is not available in a first RAN node (1), the first RAN node (1) sends a second type of control message to a second RAN node (2). The second type of control message requests the radio terminal context, and is distinct from a first type of control message that is sent to the second RAN node (2) by the first RAN node (1) when an RRC resume request message not accompanied by uplink data is received. This can contribute, for example, to enabling uplink (UL) data of a radio terminal in RRC_INACTIVE to be transmitted to a core network without relocating a radio terminal context from an old RAN node to a new RAN node.

20 Claims, 12 Drawing Sheets

(51) Int. Cl.
  *H04W 76/27* (2018.01)
  *H04W 92/10* (2009.01)
(58) Field of Classification Search
  USPC .......................................................... 370/329
  See application file for complete search history.

(56) References Cited

U.S. PATENT DOCUMENTS

| | | | |
|---|---|---|---|
| 2020/0068452 | A1 | 2/2020 | Liao et al. |
| 2022/0116810 | A1* | 4/2022 | Rugeland .......... H04W 36/0069 |
| 2023/0076409 | A1* | 3/2023 | Elkotby ............ H04W 52/0225 |
| 2023/0209635 | A1* | 6/2023 | Kim ..................... H04W 76/19 370/329 |

OTHER PUBLICATIONS

"Kim, Uplink Data Fast Transmission in CU-DU Split, Aug. 27, 2020, WO 2020171369" (Year: 2019).*
"Zheng, Information Reporting Method, Receiving Method, User Equipment, and Network Device, Apr. 29, 2021, SG 11202102858S" (Year: 2019).*
Japanese Office Action for JP Application No. 2022-500236 mailed on Feb. 7, 2023 with English Translation.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.8.0 (Dec. 2019), Jan. 8, 2020.
Extended European Search Report for EP Application No. 20918908.3, dated on Mar. 3, 2023.
CATT: "Analysis on SDT without context relocation", 3GPP DRAFT; R2-2009368, Oct. 23, 2020, pp. 1-5.
Sony: "Solution for Key Issue 2", 3GPP Draft; S2-185026, May 22, 2018, pp. 1-3.
Ericsson: "Small data transmission for inactive UEs", 3GPP Draft; [NR CP] R2-166922, Oct. 1, 2016, pp. 1-7.
International Search Report for PCT Application No. PCT/JP2020/044526, mailed on Feb. 22, 2021.
RP-193252, ZTE Corporation, "Work Item on NR small data transmissions in INACTIVE state", 3GPP TSG RAN Meeting #86, Sitges, Spain, Dec. 9-12, 2019, pp. 1-4.
R2-1910690, Ericsson, "Enhanced inter-system mobility in RRC_INACTIVE in spotty NR coverage", 3GPP TSG RAN WG2 #107, Aug. 15, 2019, pp. 1-19.
JP Office Action for Japanese Patent Application No. 2023-059768, mailed on Jul. 2, 2024 with English Translation.
LG Electronics Inc., "Further discussion on RNAU without context relocation", 3GPP TSG-RAN WG3 #102 R3-186941, Nov. 2, 2018.

* cited by examiner

RAN NODE, RADIO TERMINAL, AND METHODS THEREFOR

This application is a National Stage Entry of PCT/JP2020/044526 filed on Nov. 30, 2020, which claims priority from Japanese Patent Application 2020-022471 filed on Feb. 13, 2020, the contents of all of which are incorporated herein by reference, in their entirety.

TECHNICAL FIELD

The present disclosure relates to a radio communication network, and in particular to data transmission of a radio terminal in a Radio Resource Control (RRC)_INACTIVE state.

BACKGROUND ART

The 3rd Generation Partnership Project (3GPP) will start working on Release 17 in the first quarter of 2020. Release 17 will include support for small data transmission in RRC_INACTIVE (see Non-patent Literature 1). One of the objectives of this is to enable small data transmission in RRC_INACTIVE without anchor relocation, i.e., without relocating the UE context from the Old Radio Access Network (RAN) node (last serving RAN node) to the New RAN node.

Note that 3GPP Release 15 already supports early data transmission (EDT) for Long Term Evolution category M (LTE-M) devices and Narrow Band Internet of Things (NB-IoT) devices. The EDT technologies include control-plane EDT (CP-EDT) and user-plane EDT (UP-EDT). One of the main concepts of the EDT is that Uplink (UL) data and Downlink (DL) data are transmitted earlier in a contention based random access procedure. Specifically, the EDT enables UL data and DL data to be transmitted in the third message (Msg3) and the fourth message (Msg4), respectively, in the random access procedure.

In UP-EDT, a radio terminal (User Equipment (UE)) in RRC_INACTIVE transmits UL data together with an RRC Connection Resume Request message to a base station (eNB) in the third step of the contention based random access procedure. Upon receiving the RRC Connection Resume Request message, the new eNB obtains the UE context from the old eNB (i.e., the last serving eNB), and requests a Mobility Management Entity (MME) to conduct a path switch. This causes the MME to modify the path of an Evolved Packet System (EPS) bearer of the UE from the path through the old eNB to the path through the new eNB. The new eNB sends UL data directly to a Serving Gateway (S-GW) through the modified EPS bearer (i.e., modified S1-U bearer).

CITATION LIST

Non Patent Literature

[Non-patent Literature 1] ZTE Corporation, "Work Item on NR small data transmissions in INACTIVE state", RP-193252, 3GPP TSG RAN Meeting #86, Sitges, Spain, Dec. 9-12, 2019.

SUMMARY OF INVENTION

Technical Problem

The inventors have studied small data transmission in RRC_INACTIVE and found various problems. One of the problems is that, in the above mentioned UP-EDT introduced in Release 15, it is impossible to transmit UL data to the core network without relocating the UE context from the old eNB (last serving eNB) to the new eNB.

One of the objects to be attained by embodiments disclosed herein is to provide apparatuses, methods, and programs that contribute to enabling UL data of a radio terminal in RRC_INACTIVE to be transmitted to a core network without relocating a radio terminal context from an old RAN node (last serving RAN node) to a new RAN node. It should be noted that the above-described object is merely one of the objects to be attained by the embodiments disclosed herein. Other objects or problems and novel features will be made apparent from the following description and the accompanying drawings.

Solution to Problem

In a first aspect, a first Radio Access Network (RAN) node includes at least one memory and at least one processor coupled to the at least one memory. The at least one processor is configured to, if a Radio Resource Control (RRC) resume request message not accompanied by uplink data is received from a radio terminal in an RRC_INACTIVE state and a radio terminal context of the radio terminal is not available in the first RAN node, send a first type of control message requesting the radio terminal context to a second RAN node that is a last serving RAN node for the radio terminal. Further, the at least one processor is configured to, if the uplink data together with the RRC resume request message is received from the radio terminal in the RRC_INACTIVE state and the radio terminal context is not available in the first RAN node, send to the second RAN node a second type of control message that requests the radio terminal context and is distinct from the first type of control message.

In a second aspect, a second Radio Access Network (RAN) node includes at least one memory and at least one processor coupled to the at least one memory. The at least one processor is configured to store a radio terminal context of a radio terminal that is in a Radio Resource Control (RRC)_INACTIVE state. In addition, the at least one processor is configured to receive a control message requesting the radio terminal context from a first RAN node. Further, the at least one processor is configured to determine whether or not the control message is of a particular type that is used when the first RAN node has received uplink data together with an RRC resume request message from the radio terminal in the RRC_INACTIVE state.

In a third aspect, a radio terminal includes at least one memory and at least one processor coupled to the at least one memory. The at least one processor is configured to transmit uplink data and type information indicating a type of data activity, together with a Radio Resource Control (RRC) resume request message, to a Radio Access Network (RAN) node when the radio terminal is in an RRC_INACTIVE state.

In a fourth aspect, a method performed by a first Radio Access Network (RAN) node includes the following steps: (a) if a Radio Resource Control (RRC) resume request message not accompanied by uplink data is received from a radio terminal in an RRC_INACTIVE state and a radio terminal context of the radio terminal is not available in the first RAN node, sending a first type of control message requesting the radio terminal context to a second RAN node that is a last serving RAN node for the radio terminal; and (b) if the uplink data together with the RRC resume request message is received from the radio terminal in the RRC_I-NACTIVE state and the radio terminal context is not available in the first RAN node, sending to the second RAN node a second type of control message that requests the radio terminal context and is distinct from the first type of control message.

In a fifth aspect, a method performed by a second Radio Access Network (RAN) node includes the following steps:
(a) storing a radio terminal context of a radio terminal that is in a Radio Resource Control (RRC)_INACTIVE state;
(b) receiving a control message requesting the radio terminal context from a first RAN node; and
(c) determining whether or not the control message is of a particular type that is used when the first RAN node has received uplink data together with an RRC resume request message from the radio terminal in the RRC_INACTIVE state.

In a sixth aspect, a method performed by a radio terminal includes transmitting uplink data and type information indicating a type of data activity, together with a Radio Resource Control (RRC) resume request message, to a Radio Access Network (RAN) node when the radio terminal is in an RRC_INACTIVE state.

In a seventh aspect, a program includes a set of instructions (software codes) that, when loaded into a computer, causes the computer to perform the method according to the above-described fourth, fifth, or sixth aspect.

Advantageous Effects of Invention

According to the above-described aspects, it is possible to provide apparatuses, methods, and programs that contribute to enabling UL data of a radio terminal in RRC_INACTIVE to be transmitted to a core network without relocating a radio terminal context from an old RAN node (a last serving RAN node) to a new RAN node.

DESCRIPTION OF EMBODIMENT

Specific embodiments will be described hereinafter in detail with reference to the drawings. The same or corresponding elements are denoted by the same symbols throughout the drawings, and duplicated explanations are omitted as appropriate for the sake of clarity.

Each of the embodiments described below may be used individually, or two or more of the embodiments may be combined with one another as appropriate. These embodiments include novel features different from each other. Accordingly, these embodiments contribute to attaining objects or solving problems different from one another and also contribute to obtaining advantages different from one another.

The embodiments shown below will be described mainly for the 3rd Generation Partnership Project (3GPP) 5th generation mobile communication system (5G system (5GS)). However, these embodiments may be applied to other cellular communication systems that support small data transmission in RRC_INACTIVE.

First Embodiment

Figure 1:
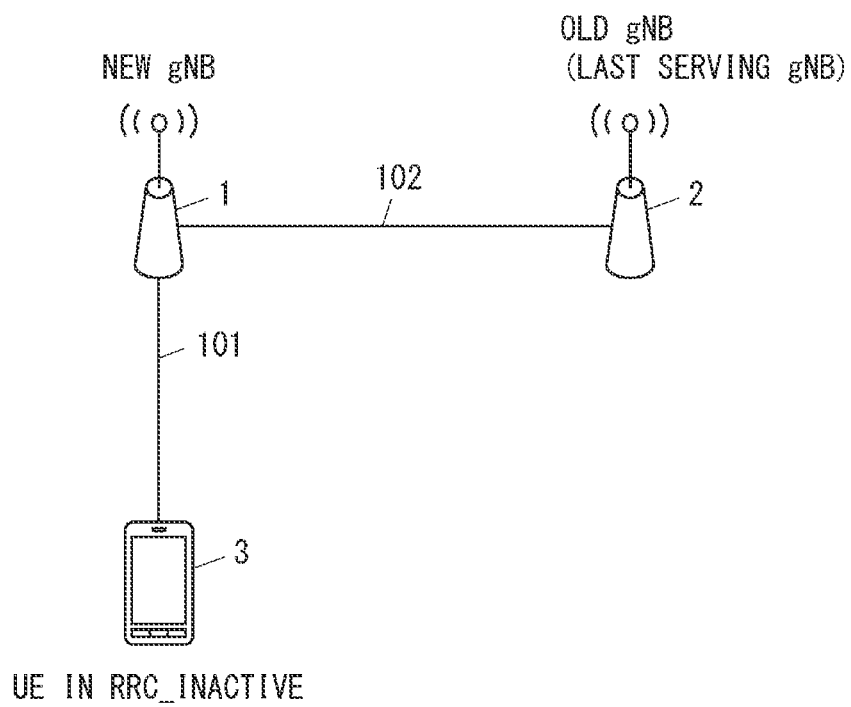
FIG. 1 shows an example of a configuration of a radio communication network according to an embodiment.

FIG. 1 shows an example of a radio communication network (i.e., 5GS) according to embodiments, including this embodiment. In the example shown in FIG. 1, a radio communication network includes two Radio Access Network (RAN) nodes (i.e., gNBs) 1 and 2, and a radio terminal (i.e., UE) 3. As described in more detail below, the UE 3 can access the gNB 1 through an air interface 101 to perform small data transmission in RRC_INACTIVE, while the gNB 1 communicates with the gNB 2, which possesses a UE context of the UE 3 in RRC_INACTIVE, through an inter-node interface 102. Accordingly, in the following, the gNB 1 is referred to as a new gNB and the gNB 2 is referred to as an old gNB or a last serving gNB. The old gNB can also be expressed as the most recent serving RAN node for the UE 3.

The inter-node interface 102 between the new gNB 1 and the old gNB 2 is an Xn interface. The Xn interface includes a control-plane interface (i.e., Xn-C interface) and a user-plane interface (i.e., Xn-U interface). The Xn-C interface supports the Xn Application Protocol (XnAP) for signaling procedures. Meanwhile, the Xn-U interface uses the General Packet Radio Service (GPRS) Tunnelling Protocol for User Plane (GTP-U) protocol. Specifically, the transport network layer (TNL) of the Xn-U interface is built on a User Datagram Protocol (UDP)/Internet Protocol (IP) network, and the GTP-U protocol is used on top of the UDP/IP protocols.

The UE 3 can initiate an RRC connection resume procedure (RRC Resume procedure) in order to transition from the RRC_INACTIVE state to the RRC_CONNECTED state again and to inform the NG-RAN of a RAN Notification Area (RNA) update. As is well known, the RRC_INACTIVE state can be regarded as an intermediate state between the RRC_CONNECTED and RRC_IDLE states. Some features of the RRC_INACTIVE state are similar to those of the RRC_CONNECTED state, while some other features of the RRC_INACTIVE state are similar to those of the RRC_IDLE state.

More specifically, when the UE 3 is in the RRC_INACTIVE state, the UE 3 and Next Generation (NG)-RAN (including the gNBs 1 and 2) maintain a UE (Access Stratum (AS)) context. The UE (AS) context, which is maintained for the UE 3 in the RRC_INACTIVE state, includes, for example, a radio bearer configuration and an AS security context. In addition, the NG-RAN maintains established control-plane and user-plane connections with the core network (i.e., 5G Core Network (5GC)) for the UE 3 in the RRC_INACTIVE state. The 5GS Connection Management (CM) state in the UE 3 and 5GC (i.e., Access and Mobility Management Function (AMF)) for the UE 3 in the RRC_INACTIVE state is the CM-CONNECTED state. In other words, the 5GC does not distinguish whether the UE 3 is in the RRC_CONNECTED state or in the RRC_INACTIVE state. These features of the RRC_INACTIVE state are similar to those of the RRC_CONNECTED state.

However, the mobility of the UE 3 in the RRC_INACTIVE state is similar to that of the UE 3 in the RRC_IDLE state. Specifically, the mobility of the UE 3 in the RRC_INACTIVE state is handled through cell reselection controlled by the UE 3. The location of the UE 3 in the RRC_INACTIVE state is known by the NG-RAN at the level of the RAN Notification Area (RNA). The RAN Notification Area (RNA) includes one or more cells, is determined by the NG-RAN, and is configured by the NG-RAN to the UE 3. The UE 3 in the RRC_INACTIVE state does not need to notify (report) the NG-RAN of cell reselection even when it moves between cells by cell reselection within the RAN notification area. The UE 3 in the RRC_INACTIVE state initiates an RRC Resume procedure and requests the NG-RAN to update the RAN notification area when it reselects a cell outside the configured RNA or when it performs a periodic RAN update.

The following describes small data transmission in RRC_INACTIVE according to this embodiment. The new gNB 1 according to this embodiment sends different types of control messages to the old gNB (last serving gNB) 2 depending on whether it has received UL data from the UE 3, which is in RRC_INACTIVE, together with an RRC (connection) resume request message (e.g., RRC Resume Request message).

Figure 2A:
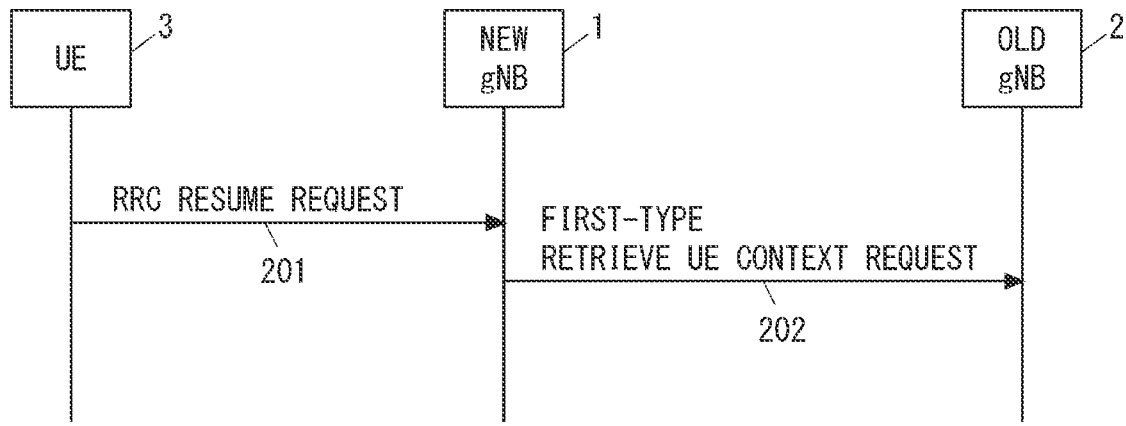
FIG. 2A is a sequence diagram showing an example of operations performed by a new gNB, old gNB, and UE according to an embodiment.

More specifically, as shown in FIG. 2A, if the new gNB 1 receives an RRC Resume Request message not accompanied by UL data from the UE 3 in RRC_INACTIVE state (Step 201) and the UE context of the UE 3 is not available in the new gNB 1, the new gNB 1 sends a first type of control message to the old gNB 2 (Step 202). The first type of control message requests the old gNB 2 to provide the UE context of the UE 3.

Figure 2B:
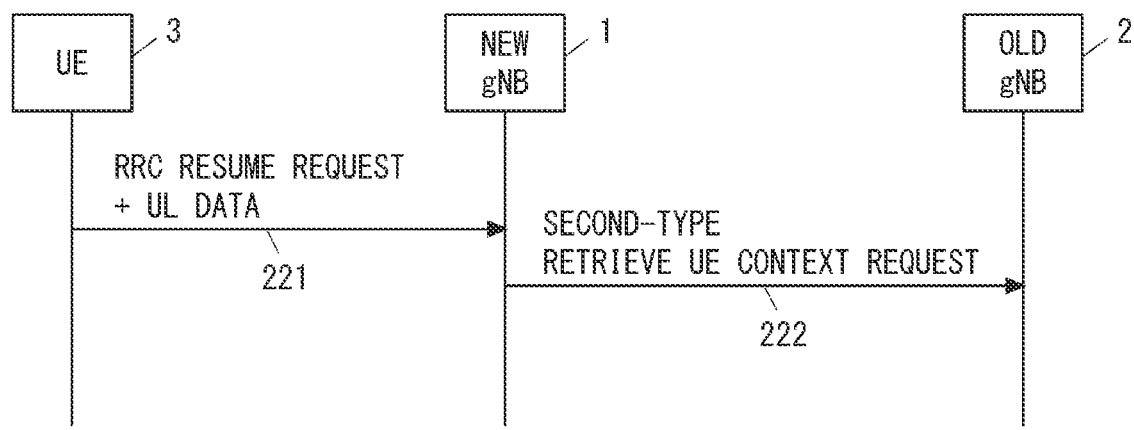
FIG. 2B is a sequence diagram showing an example of operations performed by a new gNB, old gNB, and UE according to an embodiment.

In contrast, as shown in FIG. 2B, if the new gNB 1 receives UL data together with an RRC Resume Request message from the UE 3 in RRC_INACTIVE (Step 221) and the UE context of the UE 3 is not available in the new gNB 1, the new gNB 1 sends a second type of control message to the old gNB 2 (Step 222). Similarly to the first type of control message, the second type of control message requests the old gNB 2 to provide the UE context of the UE 3. However, the second type of control message is distinguished from the first type of control message by the new gNB 1 and the old gNB 2.

In some implementations, the second type of control message may be distinguished from the first type of control message by the fact that the second type of control message includes an indication indicating, directly or indirectly, the presence of UL data. More specifically, the first type of control message may be similar to the existing XnAP: RETRIEVE UE CONTEXT REQUEST message. Meanwhile, the second type of control message may be an improved RETRIEVE UE CONTEXT REQUEST message that includes a new Information Element (IE) or new cause value that directly or indirectly indicates the presence of UL data. The direct or indirect indication of the presence of UL data may be, for example, a new IE indicating that (small) data is available (e.g., (small) data available), or new cause value indicating (small) data to be forwarded (e.g., (small) data to be forwarded). Alternatively, the second type of control message may be a newly defined XnAP message that contains the same information as, but is different from, the RETRIEVE UE CONTEXT REQUEST message. When the new gNB 1 receives UL data from the UE 3 in RRC_INACTIVE, it may use this new XnAP message to inform the old gNB 2 of the presence of the UL data. The new XnAP message may be referred to as, for example, a RETRIEVE UE CONTEXT REQUEST FOR DATA TRANSFER message or a DATA TRANSFER REQUEST message.

Additionally or alternatively, in some implementations, the second type of control message may be distinguished from the first type of control message by the fact that the second type of control message includes an indication representing a request for transport network layer (TNL) information of the old gNB 2. The TNL information may be referred to as transport layer information. More specifically, the first type of control message may be similar to the existing XnAP: RETRIEVE UE CONTEXT REQUEST message. Meanwhile, the second type of control message may be an improved RETRIEVE UE CONTEXT REQUEST message that includes a new Information Element (IE) or new cause value indicating a request for TNL information of the old gNB 2. Alternatively, the second type of control message may be a newly defined XnAP message that contains the same information as, but is different from, the RETRIEVE UE CONTEXT REQUEST message. When the new gNB 1 receives UL data from the UE 3 in RRC_INACTIVE, it may use this new XnAP message to request the TNL information of the old gNB 2. The new XnAP message may be referred to as, for example, a RETRIEVE UE CONTEXT REQUEST FOR DATA TRANSFER message or a DATA TRANSFER REQUEST message.

The TNL information (or transport layer information) of the old gNB 2 may also be referred to as a TNL address (or transport layer address) of the old gNB 2. The TNL information or TNL address of the old gNB 2 is used by the new gNB 1 to send UL data from the new gNB 1 to the old gNB 2 via a user-plane interface (i.e., Xn-U interface). Accordingly, the TNL information or TNL address of the old gNB 2 may be a combination of a Tunnel Endpoint Identifier (TEID), which indicates the endpoint of the GTP-U tunnel on the old gNB 2 side, and an IP address of the old gNB 2. The IP address of the old gNB 2 used to transfer GTP-U/UDP/IP packets on the Xn-U interface (GTP-U tunnel) may be the same as or different from the IP address of the old gNB 2 used to transfer XnAP/Stream Control Transmission Protocol (SCTP)/IP packets on the Xn-C interface (XnAP protocol).

Additionally or alternatively, in some implementations, the second type of control message may be distinguished from the first type of control message by the fact that the second type of control message contains UL data (i.e., Dedicated Traffic Channel (DTCH) data) itself. More specifically, the first type of control message may be similar to the existing XnAP: RETRIEVE UE CONTEXT REQUEST message. Meanwhile, the second type of control message may be a RETRIEVE UE CONTEXT REQUEST message that has been improved so as to carry (piggybacked) UL data (i.e., DTCH data). Alternatively, the second type of control message may be a newly defined XnAP message that contains the same information as, but is different from, the RETRIEVE UE CONTEXT REQUEST message. When the new gNB 1 receives UL data from the UE 3 in RRC_INACTIVE, it may use this new XnAP message in order to forward the UL data to the old gNB 2. The new XnAP message may be referred to as, for example, a RETRIEVE UE CONTEXT REQUEST FOR DATA TRANSFER message or a DATA TRANSFER REQUEST message. The new gNB 1 may include, in the second type of control message, additional information needed to identify or decipher the UL data of the UE 3. This additional information may include one or both of a Data Radio Bearer (DRB) ID and a Logical Channel ID (LCID).

The old gNB 2 receives a control message (Step 202 or 222) requesting the UE context of the UE 3 in RRC_INACTIVE from the new gNB 1. The old gNB 2 then determines whether the received control message is of the first type or the second type. In other words, the old gNB 2 identifies the type of the received control message. The old gNB 2 may perform different actions depending on the type of the received control message.

In some implementations, if the control message received from the new gNB 1 is of the second type, the old gNB 2 may operate to allow the UL data of the UE 3 to be transmitted to the core network (5GC) via the old gNB 2 without providing the UE context of the UE 3 to the new gNB 1. More specifically, the old gNB 2 sends, to the new gNB 1, an XnAP message (e.g., RETRIEVE UE CONTEXT FAILURE message) indicating that the UE context of the UE 3 will not be relocated. This XnAP message may include the TNL information of the old gNB 2. In other words, the XnAP message may indicate the permission of an uplink data transfer via the old gNB 2. Alternatively, the old gNB 2 may send, to the new gNB 1, a message indicating the TNL information of the old gNB 2 (e.g., XN-U ADDRESS INDICATION message) separately from the XnAP message indicating that the UE context of the UE 3 will not be relocated (e.g., RETRIEVE UE CONTEXT FAILURE message). In response to the reception of this XnAP message, the new gNB 1 sends the UL data of the UE 3 to the old gNB 2 via the Xn-U interface (i.e., GTP-U tunnel). The old gNB 2 then extracts IP data (i.e., one or more IP packets) by deciphering on the UL data (i.e., DTCH data) received from the new gNB 1. Further, the old gNB 2 sends this IP data to a core network node (i.e., User Plane Function (UPF) in 5GC) through the user-plane connection (i.e., N3 GTP-U tunnel) with the core network which has been maintained for the UE 3 that is in RRC_INACTIVE.

Additionally or alternatively, if the control message received from the new gNB 1 is of the second type, the old gNB 2 may determine whether or not to send the UL data of the UE 3, which is in RRC_INACTIVE, to the core network (5GC) via the old gNB 2. In response to a decision to send the UL data via the old gNB 2, the old gNB 2 may operate as described above. On the other hand, in response to a decision not to send the UL data via the old gNB 2, the old gNB 2 may provide the UE context of the UE 3 to the new gNB 1. In this case, the new gNB 1 may receive the UE context of the UE 3 from the old gNB 2, extract IP data by deciphering the UL data of the UE 3 using the UE context, and send this data directly (i.e., without via the old gNB 2) to the core network node (i.e., User Plane Function (UPF) in 5GC).

As can be understood from the above description, in this embodiment, the new gNB 1 send different types of messages to the old gNB (last serving gNB) 2 depending on whether the new gNB 1 has received UL data together with an RRC (connection) resume request message (e.g., RRC Resume Request message) from the UE 3, which is in RRC_INACTIVE. If the new gNB 1 receives an RRC Resume Request message not accompanied by UL data from the UE 3 that is in RRC_INACTIVE (Step 201) and the UE context of the UE 3 is not available in the new gNB 1, the new gNB 1 sends the first type of control message to the old gNB 2 (Step 202). The first type of control message requests the old gNB 2 to provide the UE context of the UE 3. In contrast, when the new gNB 1 receives UL data together with an RRC Resume Request message from the UE 3 that is in RRC_INACTIVE (Step 221) and the UE context of the UE 3 is not available in the new gNB 1, the new gNB 1 sends the second type of control message to the old gNB 2 (Step 222). The second type of control message requests the old gNB 2 to provide the UE context of the UE 3, similarly to the first type of control message. However, the second type of control message is distinguished from the first type of control message by the new gNB 1 and the old gNB 2. The old gNB 2 then determines whether the received control message is of the first type or the second type. This allows the new gNB 1 to inform the old gNB 2 that there is UL data from the UE 3 that is in RRC_INACTIVE, and allows the old gNB 2 to operate so as to enable the UL data to be sent to the core network via the old gNB 2. This embodiment thus contributes to enabling the UL data of the UE 3 in RRC_INACTIVE to be transmitted to the core network without relocating the UE context from the old gNB 2 to the new gNB 1.

Second Embodiment

This embodiment provides a specific example of the data transmission in RRC_INACTIVE described in the first embodiment. An example of a configuration of a radio communication network according to this embodiment is similar to that shown in FIG. 1.

Figure 3:
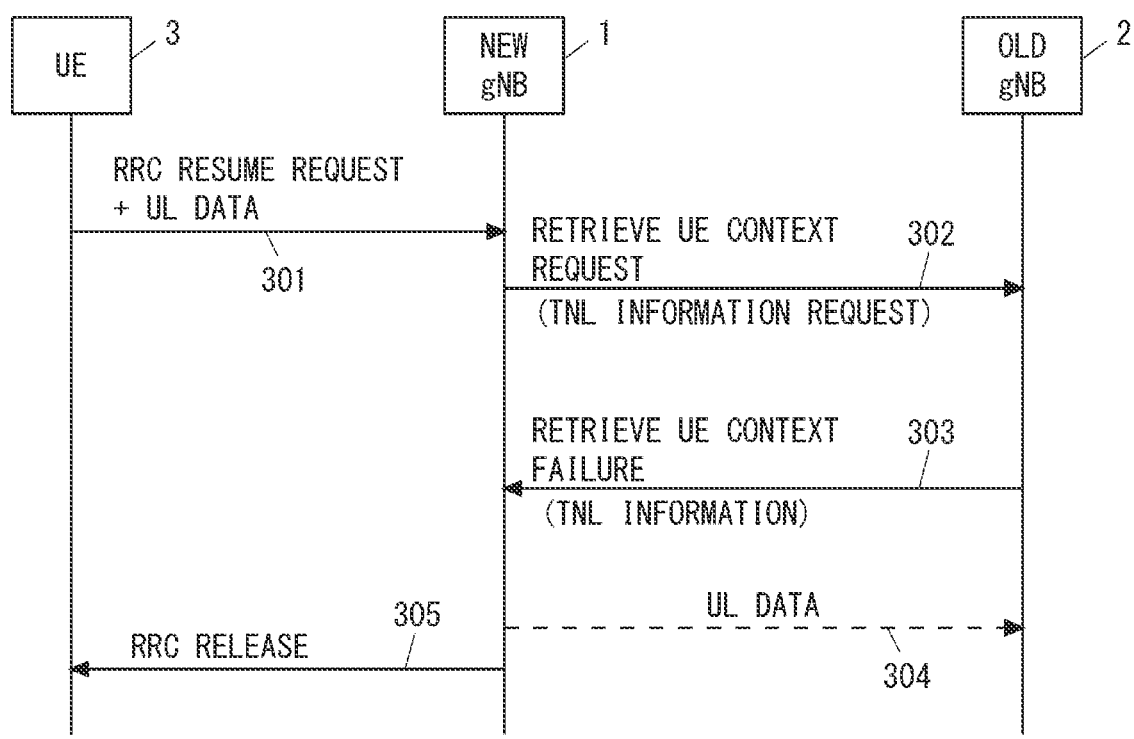
FIG. 3 is a sequence diagram showing an example of operations performed by a new gNB, old gNB, and UE according to an embodiment.

FIG. 3 shows a first example of the data transmission in RRC_INACTIVE of this embodiment. In step 301, the UE 3, which is in RRC_INACTIVE, transmits UL data (i.e., DTCH data) together with an RRC Resume Request message (i.e., Common Control Channel (CCCH) data) to the new gNB 1. More specifically, when the UE 3 receives from the old gNB 2 (which is the old gNB, but is the serving gNB at the time when the UE 3 receives the RRC Release message) an RRC Release message containing information (SuspendConfig IE) indicating an indication to transition from RRC_CONNECTED to RRC_INACTIVE, the UE 3 stores configuration information (e.g., UE context) needed to transmit the UL data via the RRC Resume Request message, and uses it in step 301. The RRC Resume Request message and the UL data may be transmitted in the third message of a 4-Step Contention Based Random Access (CBRA) procedure. Alternatively, the RRC Resume Request message and the UL data may be transmitted in the first message (Message A (MsgA)) of a 2-Step Contention Based Random Access (2-Step CBRA) procedure.

More specifically, in some implementations, the new gNB 1 sends, to the UE 3 via the second message (Random Access Response) of the 4-step random access procedure, a UL resource grant (UL grant) for transmission of the third message having a transport block size (TBS) required to transmit the RRC Resume Request message (CCCH data) and UL data (DTCH data). The RRC layer of the UE 3 then resumes all the signaling radio bearers (SRBs) and data radio bearers (DRBs), derives new security keys, and re-establishes Access Stratum (AS) security. Meanwhile, in the User Plane (UP) protocol of the UE 3, the Service Data Adaptation Protocol (SDAP) layer of the UE 3 generates SDAP data from IP data (QoS flow) and passes it to the Packet Data Convergence Protocol (PDCP) layer. The PDCP layer of the UE 3 then cyphers the SDAP data, generates PDCP data, and passes it to the Radio Link Control (RLC) layer of the UE 3. The RLC layer of the UE 3 generates RLC data (also referred to as DTCH data) from the PDCP data, and passes it to the Medium Access Control (MAC) layer of the UE 3. Then, the MAC layer of the UE 3 multiplexes a MAC sub-Protocol Data Unit (PDU) containing the RRC Resume Request message (CCCH data) and a MAC sub-PDU containing the UL data (DTCH data) into one uplink MAC PDU. The Medium Access Control (MAC) layer of the UE 3 transmits the uplink MAC PDU (transport block) in the Uplink Shared Channel (UL-SCH) resources allocated by the second message. The new gNB 1 extracts the RRC Resume Request message (CCCH data) and UL data (DTCH data) from the received uplink MAC PDU.

The DRB(s) resumed by the UE 3 may be only the DRB(s) for which the old gNB 2 has allowed, in the RRC Release message, the UE 3 to perform data transmission in the RRC Resume. The SDAP layer of the UE 3 may pass the SDAP data to the PDCP layer based on an association between IP data (QoS flow(s)) and DRB(s) (i.e., QoS flow to DRB mapping rule) that was in use at the time of entering the RRC_INACTIVE state. Additionally or alternatively, the PDCP layer of the UE 3 may pass the PDCP data to the RLC layer without ciphering the SDAP data. In addition, the RLC layer of the UE 3 may pass, in a Transparent Mode (TM), the PDCP data as it is to the MAC layer as RLC data (DTCH data).

Alternatively, the MAC layer of the UE 3 may generate a first uplink MAC PDU containing the RRC Resume Request message (CCCH data) and a second uplink MAC PDU containing the UL data (DTCH data), and transmit these two MAC PDUs in sequence with consecutive UL-SCH resources in time. The RRC Resume Request message may contain information indicating that UL data will be successively transmitted. Further, these resources may be designated by the new gNB 1 via the second message of the 4-step random access (4-Step RA) procedure. In the case where the 2-step random access (2-Step RA) procedure is used, the UE 3 may transmit these two MAC PDUs by a predetermined resource(s) for the first message (MsgA). The new gNB 1 may first receive the first uplink MAC PDU, recognize, from the first uplink MAC PDU, that it should successively receive the second uplink MAC PDU, and also receive the second uplink MAC PDU. The new gNB 1 extracts the RRC Resume Request message (CCCH data) from the received first uplink MAC PDU and extracts the UL data (DTCH data) from the received second uplink MAC PDU. In this case, the new gNB 1 may send the second type of control message to the old gNB 2 if the new gNB 1 receives, from the UE 3 in RRC_INACTIVE, the UL data subsequent to the RRC Resume Request message and the UE context of the UE 3 is not available in the new gNB 1.

In step 302, in response to the reception of the UL data together with the RRC Resume Request message, the new gNB 1 sends the second type of control message to the old gNB 2. More specifically, in the example shown in FIG. 3, the new gNB 1 sends an improved RETRIEVE UE CONTEXT REQUEST message including a new IE or new cause value (e.g., TNL INFORMATION REQUEST) indicating a request for TNL information of the old gNB 2.

The old gNB 2 detects that the received RETRIEVE UE CONTEXT REQUEST message includes the IE or cause value indicating a request for TNL information of the old gNB 2. The old gNB 2 then decides not to relocate the UE context of the UE 3 to the new gNB 1. In step 303, the old gNB 2 sends a RETRIEVE UE CONTEXT FAILURE message. This RETRIEVE UE CONTEXT FAILURE message includes an IE indicating the TNL information (e.g., TEID and IP address) of the old gNB 2. In addition, this RETRIEVE UE CONTEXT FAILURE message includes an RRC Release message to be transmitted to the UE 3. The RRC Release message is contained in an Old NG-RAN node To New NG-RAN node Resume Container IE in the RETRIEVE UE CONTEXT FAILURE message. This RETRIEVE UE CONTEXT FAILURE message may further include a cause value indicating that the UE context will not be relocated (e.g., Non-relocation of context). Alternatively, this RETRIEVE UE CONTEXT FAILURE message may include a cause value indicating data transfer without UE context relocation (e.g., Data transfer without context relocation).

In step 304, the new gNB 1 transmits the UL data (DTCH data) of the UE 3 to the TNL address received in step 303. The old gNB 2 extracts the IP data (i.e., one or more IP packets) by deciphering the UL data (i.e., DTCH data) received from the new gNB 1. More specifically, the old gNB 2 extracts the SDAP PDU from the deciphered PDCP Service Data Unit (SDU). The old gNB 2 then extracts the SDAP SDU corresponding to the QoS flow based on the stored association between QoS flow(s) and DRB(s) (i.e., QoS flow to DRB mapping rule) assigned to the UE 3, and converts it into the IP data. Further, the old gNB 2 sends this IP data to a core network node (i.e., User Plane Function (UPF) in 5GC) through the user-plane connection (i.e., N3 GTP-U tunnel) with the core network which has been maintained for the UE 3 that is in RRC_INACTIVE.

In step 305, the new gNB 1 forwards the RRC Release message received in step 303 to the UE 3. The new gNB 1 may transmit the RRC Release message in the fourth message (Msg4) of the 4-step random access procedure. Alternatively, the new gNB 1 may transmit the RRC Release message in the second message (Message B (MsgB)) of the 2-step random access procedure. In this case, the second message (MsgB) may contain information for contention resolution (Contention Resolution MAC Control Element (CE)) and the RRC Release message. In response to receiving the RRC Release message, the UE 3 remains in the RRC_INACTIVE state. This allows the UE 3 to send the UL data without transitioning from the RRC_INACTIVE state to the RRC_CONNECTED state.

The procedure shown in FIG. 3 may be modified as appropriate. For example, when the new gNB 1 already knows the TNL address of the old gNB 2, the new gNB 1 may send the UL data of the UE 3 to the old gNB 2 on the Xn-U interface before receiving the RETRIEVE UE CONTEXT FAILURE message in step 303. For example, the new gNB 1 may send the UL data of the UE 3 on the Xn-U interface immediately after transmitting the RETRIEVE UE CONTEXT REQUEST message on the Xn-C interface in step 303. Alternatively, the new gNB 1 may send the UL data of the UE 3 on the Xn-U interface substantially simultaneously with the transmission of the RETRIEVE UE CONTEXT REQUEST message on the Xn-C interface in step 303. This allows the UL data to be transmitted earlier.

The notification of the TNL address of the old gNB 2 may be sent from the old gNB 2 to the new gNB 1 through a separate XnAP message independent of the RETRIEVE UE CONTEXT FAILURE message in step 303. This XnAP message may be an XN-U ADDRESS INDICATION message. This XnAP message (e.g., XN-U ADDRESS INDICATION message) may be transmitted prior to the RETRIEVE UE CONTEXT FAILURE message in step 303.

Figure 4:
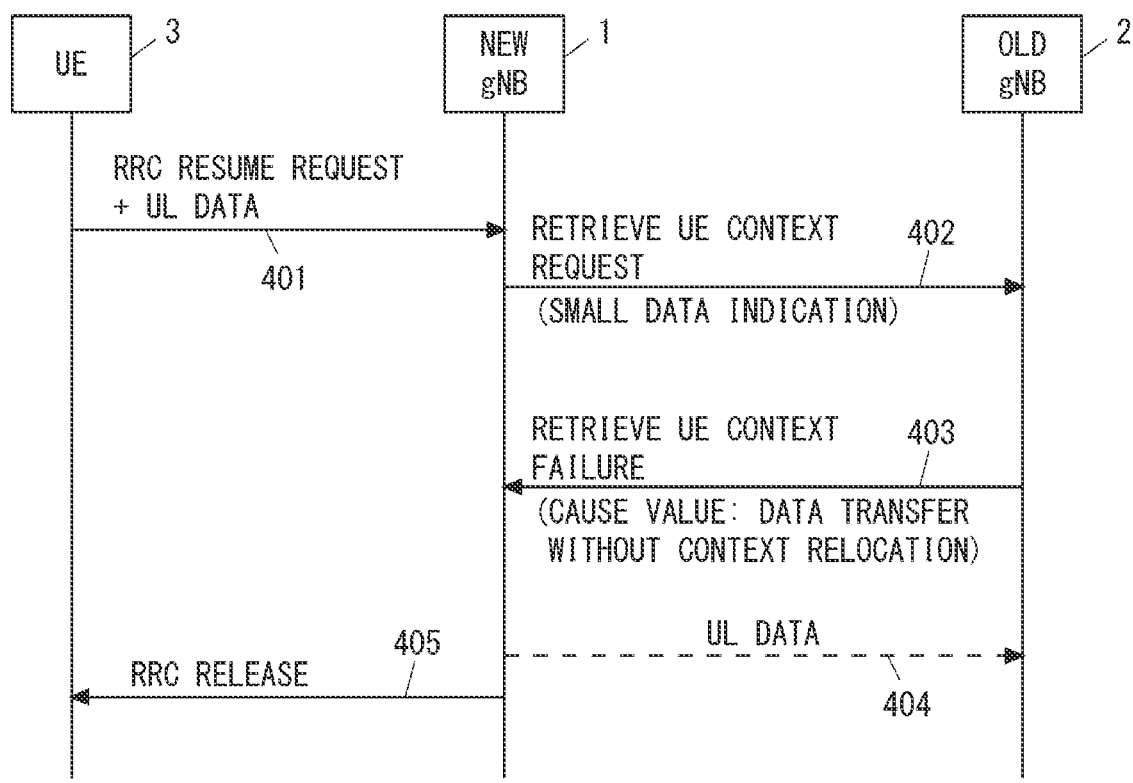
FIG. 4 is a sequence diagram showing an example of operations performed by a new gNB, old gNB, and UE according to an embodiment.

FIG. 4 shows a second example of the data transmission in RRC_INACTIVE according to this embodiment. Steps 401 to 405 in FIG. 4 are basically the same as steps 301 to 305 in FIG. 3. However, the RETRIEVE UE CONTEXT REQUEST message in step 402 includes a new IE (e.g., UL DATA INDICATION) or new cause value (e.g., Data available for transfer) indicating the presence of UL data. The RETRIEVE UE CONTEXT FAILURE message in step 403 includes a cause value (e.g., Data transfer without context relocation) indicating data transfer without UE context relocation. The RETRIEVE UE CONTEXT FAILURE message may include an IE indicating the TNL information of the old gNB 2.

Figure 5:
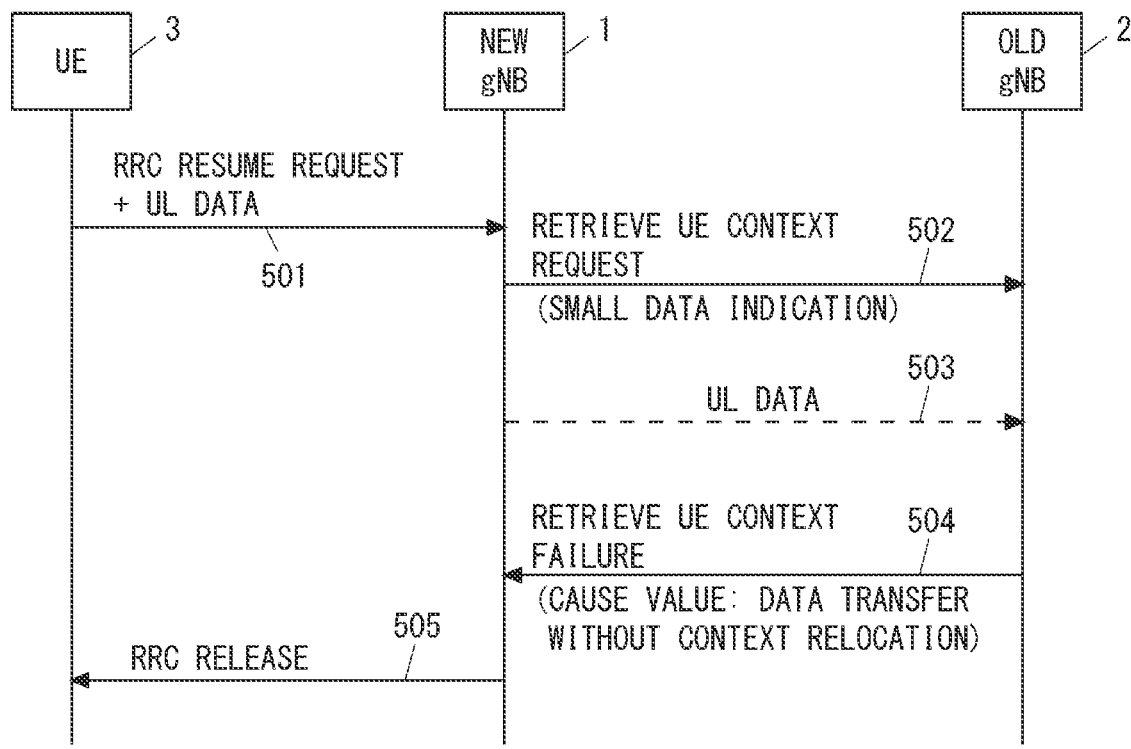
FIG. 5 is a sequence diagram showing an example of operations performed by a new gNB, old gNB, and UE according to an embodiment.

FIG. 5 shows a third example of the data transmission in RRC_INACTIVE according to this embodiment. As already described with reference to FIG. 3, if the new gNB 1 already knows the TNL address of the old gNB 2, the new gNB 1 may send the UL data of the UE 3 earlier than the reception of the RETRIEVE UE CONTEXT FAILURE message (Step 303). In the example shown in FIG. 5, the new gNB 1 sends the UL data to the old gNB 2 (Step 503) after transmitting the RETRIEVE UE CONTEXT REQUEST message (Step 502). Steps 501, 502, 504 and 505 are similar to their corresponding steps in FIG. 3 or 4.

Figure 6:
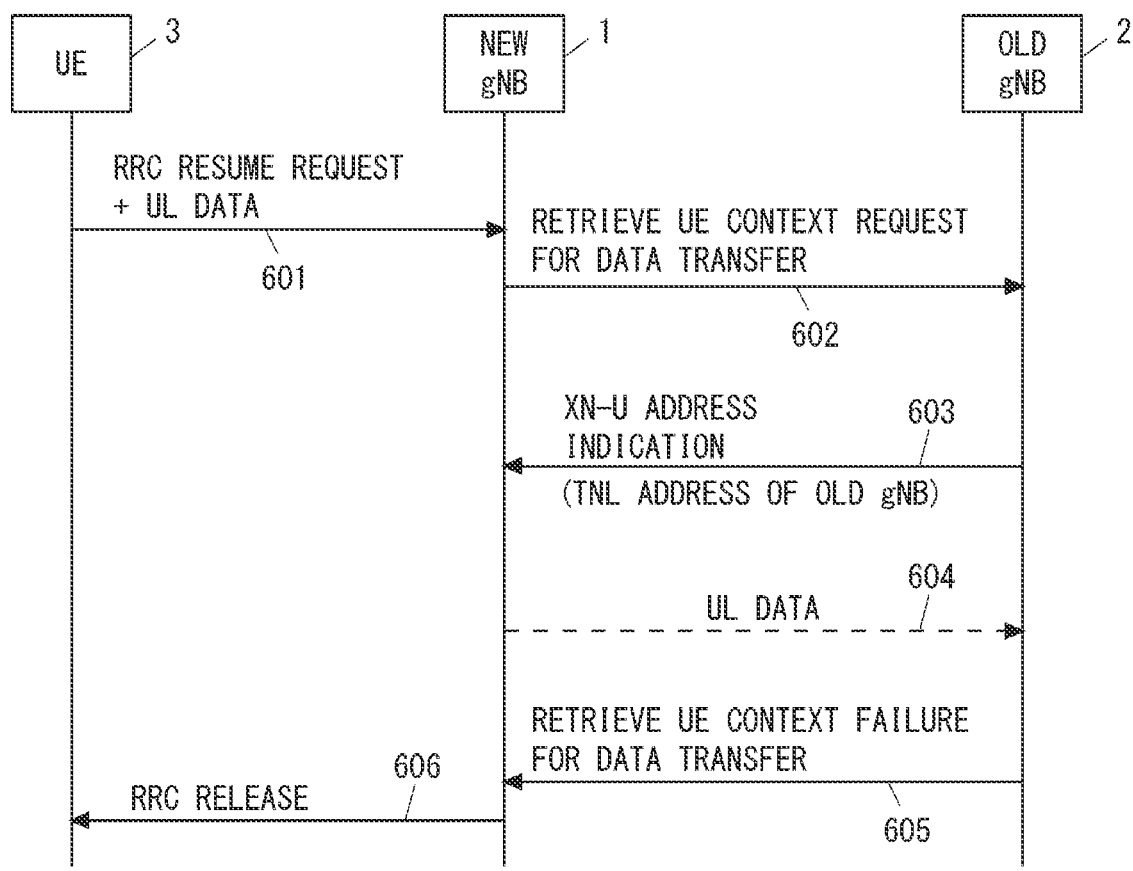
FIG. 6 is a sequence diagram showing an example of operations performed by a new gNB, old gNB, and UE according to an embodiment.

FIG. 6 shows a fourth example of the data transmission in RRC_INACTIVE according to this embodiment. Step 601 is similar to step 301 in FIG. 3, step 401 in FIG. 4, and step 501 in FIG. 5. In step 602, the new gNB 1 sends, to the old gNB 2, a newly defined XnAP message that contains the same information as, but is different from, the existing RETRIEVE UE CONTEXT REQUEST message. As shown in FIG. 6, this new XnAP message may be a RETRIEVE UE CONTEXT REQUEST FOR DATA TRANSFER message.

As already described with reference to FIG. 3, the notification of the TNL address of the old gNB 2 may be sent from the old gNB 2 to the new gNB 1 through a separate XnAP message independent of the RETRIEVE UE CONTEXT FAILURE message (Step 303). In the example shown in FIG. 6, the old gNB 2 sends an XN-U ADDRESS INDICATION message to the new gNB 1 (Step 603) after receiving the RETRIEVE UE CONTEXT REQUEST FOR DATA TRANSFER message (Step 602). This XN-U ADDRESS INDICATION message indicates the TNL address (e.g., TEID and IP address) of the old gNB 2. After that, the old gNB 2 sends a RETRIEVE UE CONTEXT FAILURE FOR DATA TRANSFER message (Step 605). The old gNB 2 may send the RETRIEVE UE CONTEXT FAILURE FOR DATA TRANSFER message (Step 605) after receiving the UL data of the UE 3 from the new gNB 1 (Step 604). The RETRIEVE UE CONTEXT FAILURE FOR DATA TRANSFER message includes an RRC Release message to be transmitted to the UE 3. Similarly to step 305 in FIG. 3, in step 606, the new gNB 1 forwards the RRC Release message received in step 605 to the UE 3. In response to the reception of the RRC Release message, the UE 3 remains in the RRC_INACTIVE state. This allows the UE 3 to send the UL data without transitioning from the RRC_INACTIVE state to the RRC_CONNECTED state.

Figure 7:
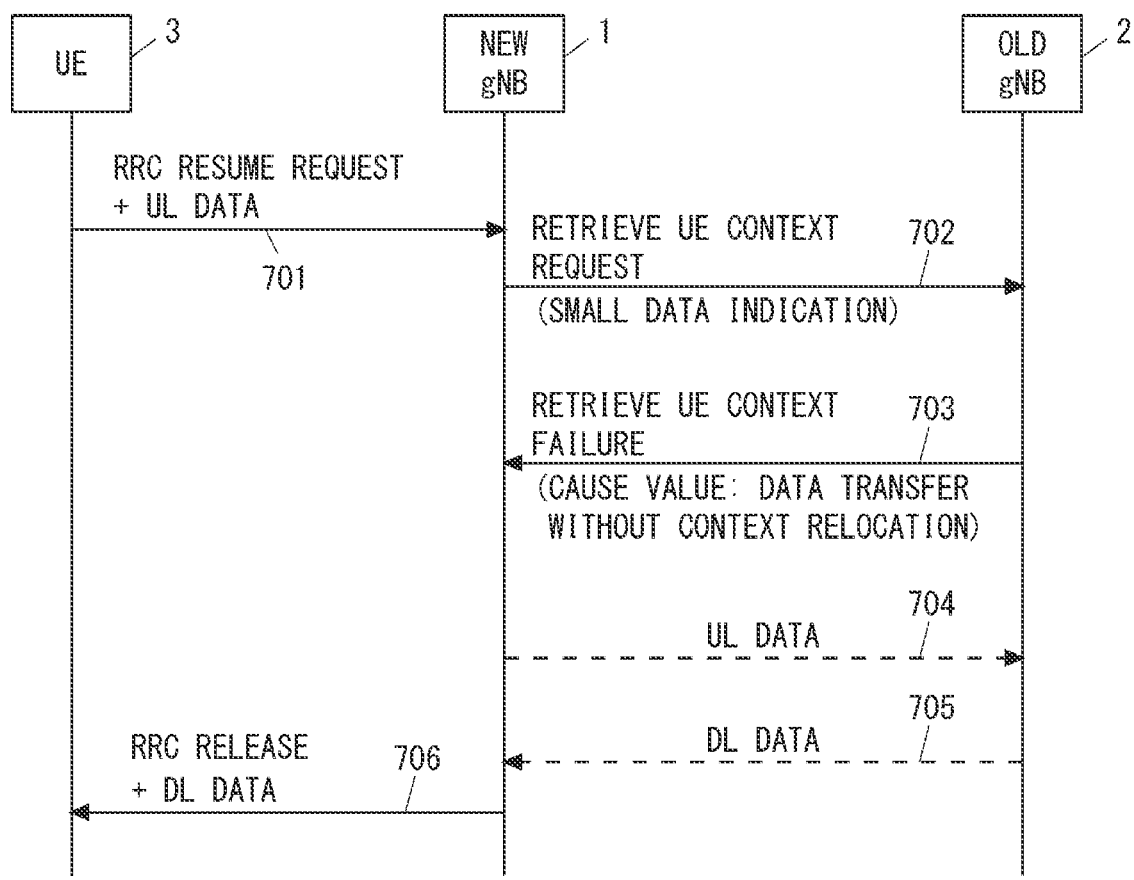
FIG. 7 is a sequence diagram showing an example of operations performed by a new gNB, old gNB, and UE according to an embodiment.

FIG. 7 shows a fifth example of the data transmission in RRC_INACTIVE according to this embodiment. In the example shown in FIG. 7, DL data is transmitted in addition to the UL data. Steps 701 to 704 are similar to, for example, steps 301 to 304 in FIG. 3 or steps 401 to 404 in FIG. 4. In step 705, the old gNB 2 forwards DL data of the UE 3 to the new gNB 1 via the Xn-U interface. To enable this, the RETRIEVE UE CONTEXT REQUEST message in step 702 may include an IE indicating the TNL information (e.g., TEID and IP address) of the new gNB 1. The IP address of the new gNB 1 used to transfer GTP-U/UDP/IP packets on the Xn-U interface (GTP-U tunnel) may be the same as or different from the IP address of the new gNB 1 used to transfer XnAP/SCTP/IP packets on the Xn-C interface (XnAP protocol). The DL data transfer in step 705 may be performed before the UL data transfer in step 704 or in parallel with the UL data transfer in step 704.

In step 706, the new gNB 1 transmits, to the UE 3, the DL data received in step 705 together with the RRC Release message contained in the RETRIEVE UE CONTEXT FAILURE message received in step 703. In response to the reception of the RRC Release message, the UE 3 remains in the RRC_INACTIVE state. This allows the UE 3 to send the UL data and receive the DL data without transitioning from the RRC_INACTIVE state to the RRC_CONNECTED state.

The procedure shown in FIG. 7 may be modified as appropriate. For example, if the new gNB 1 already knows the TNL information of the old gNB 2, the new gNB 1 may send the UL data of the UE 3 to the old gNB 2 on the Xn-U interface before receiving the RETRIEVE UE CONTEXT FAILURE message in step 703. Further, if the old gNB 2 already knows the TNL information of the new gNB 1, the old gNB 2 may send the DL data of the UE 3 to the new gNB 1 on the Xn-U interface before sending the RETRIEVE UE CONTEXT FAILURE message in step 703. Steps 704 and 705 may be performed before step 703.

Figure 8:
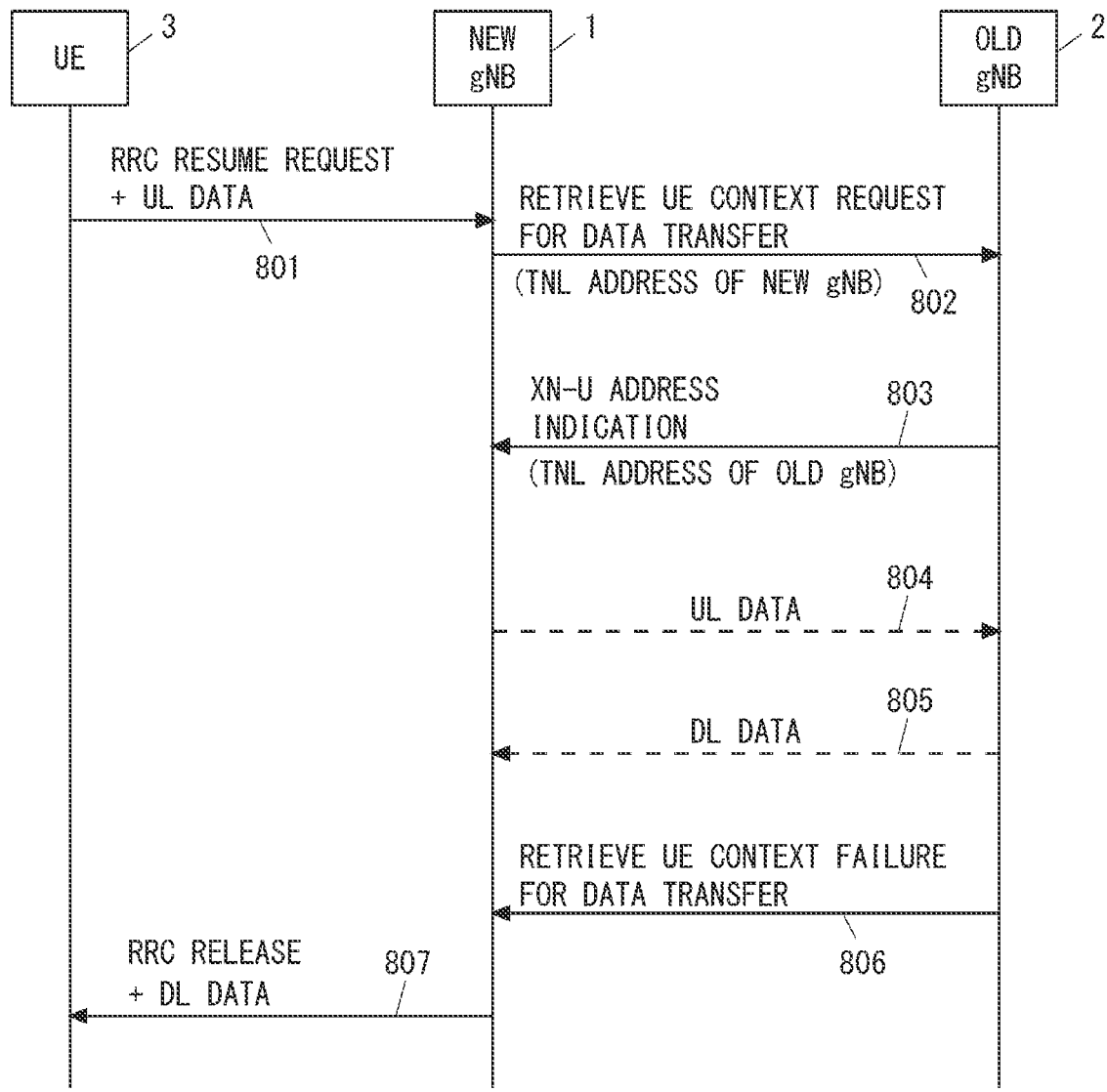
FIG. 8 is a sequence diagram showing an example of operations performed by a new gNB, old gNB, and UE according to an embodiment.

FIG. 8 shows a sixth example of the data transmission in RRC_INACTIVE according to this embodiment. The example shown in FIG. 8 is an addition of DL data transmission to the example shown in FIG. 6. Step 801 is similar to step 601 in FIG. 6. In step 802, a newly defined XnAP message that contains the same information as, but is different from, the existing RETRIEVE UE CONTEXT REQUEST message is sent to the old gNB 2. This new XnAP message includes an IE indicating the TNL information of the new gNB 1. As shown in FIG. 8, this new XnAP message may be a RETRIEVE UE CONTEXT REQUEST FOR DATA TRANSFER message.

Step 803 is similar to step 603 in FIG. 6. Step 804 is similar to step 604 in FIG. 6. In step 805, the old gNB 2 forwards the DL data of the UE 3 to the new gNB 1 through the Xn-U interface. The DL data transfer in step 805 may be performed before the UL data transfer in step 804 or in parallel with the UL data transfer in step 804.

Step 806 is similar to step 605 in FIG. 6. In step 807, the new gNB 1 forwards to the UE 3 the RRC Release message received via the RETRIEVE UE CONTEXT FAILURE FOR DATA TRANSFER message in step 806. Further, in step 807, the new gNB 1 sends the DL data, received in step 805, to the UE 3 together with the RRC Release message. In response to the reception of the RRC Release message, the UE 3 remains in the RRC_INACTIVE state. This allows the UE 3 to transmit the UL data and receive the DL data without transitioning from the RRC_INACTIVE state to the RRC_CONNECTED state.

Third Embodiment

This embodiment provides a specific example of the data transmission in RRC_INACTIVE described in the first embodiment. An example of a configuration of a radio communication network according to this embodiment is similar to that shown in FIG. 1.

Figure 9:
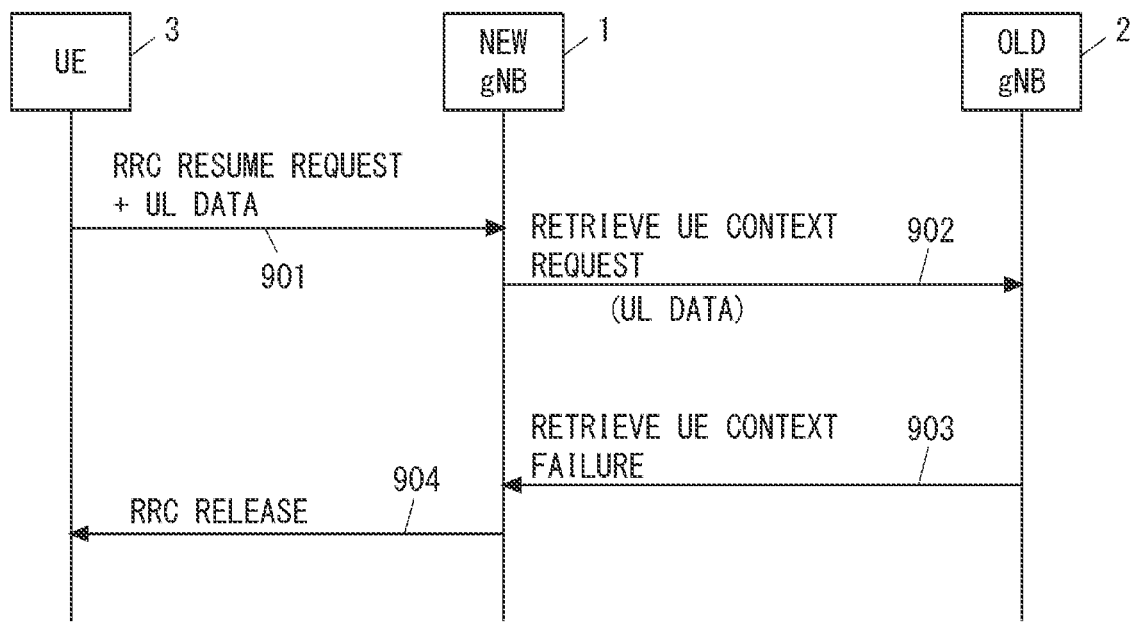
FIG. 9 is a sequence diagram showing an example of operations performed by a new gNB, old gNB, and UE according to an embodiment.

FIG. 9 shows an example of the data transmission in RRC_INACTIVE of this embodiment. Step 901 is similar to step 301 in FIG. 3. In step 902, in response to receiving the UL data together with the RRC Resume Request message, the new gNB 1 sends the second type of control message to the old gNB 2. More specifically, in the example shown in FIG. 9, the new gNB 1 sends an improved RETRIEVE UE CONTEXT REQUEST message including a new IE that contains the UL data (i.e., i.e., DTCH data) itself. The XnAP message in step 902 may be a new XnAP message that contains the same information as, but is different from, the RETRIEVE UE CONTEXT REQUEST message.

In some implementations, the UL data (i.e., DTCH data) may be included in an IE of a new transparent container (e.g., New NG-RAN node To Old NG-RAN node Resume Container) from the new gNB 1 to the old gNB 2. The name of this new IE may be, for example, a Data Over CP IE or a Data Container IE. The new gNB 1 may include, in the XnAP message in step 902, additional information needed to identify or decipher the UL data of the UE 3. This additional information may include a DRB ID and an LCID.

The old gNB 2 detects that the received RETRIEVE UE CONTEXT REQUEST message includes the IE that contains the UL data (i.e., DTCH data). The old gNB 2 then decides not to relocate the UE context of the UE 3 to the new gNB 1. In step 903, the old gNB 2 sends a RETRIEVE UE CONTEXT FAILURE message. This RETRIEVE UE CONTEXT FAILURE message includes an RRC Release message to be transmitted to the UE 3. The RRC Release message is contained in an Old NG-RAN node To New NG-RAN node Resume Container IE in the RETRIEVE UE CONTEXT FAILURE message. This RETRIEVE UE CONTEXT FAILURE message may contain a cause value (e.g., Non-relocation of context) indicating that the UE context will not be relocated. Alternatively, this RETRIEVE UE CONTEXT FAILURE message may include a cause value indicating data transfer without UE context relocation (e.g., Data transfer without context relocation). The XnAP message in step 903 may be a new XnAP message that contains the same information as, but is different from, the RETRIEVE UE CONTEXT FAILURE message.

In step 904, the new gNB 1 forwards the RRC Release message received in step 903 to the UE 3. The new gNB 1 may transmit the RRC Release message in the fourth message (Msg4) of the 4-step random access procedure. Alternatively, the new gNB 1 may transmit the RRC Release message in the second message (Message B (MsgB)) of the 2-step random access procedure. In response to receiving the RRC Release message, the UE 3 remains in the RRC_INACTIVE state. This allows the UE 3 to send the UL data without transitioning from the RRC_INACTIVE state to the RRC_CONNECTED state.

This embodiment allows the UL data of the UE 3 to be transmitted early at the same time as the first XnAP message from the new gNB 1 to the old gNB 2.

Fourth Embodiment

This embodiment provides a modified example of the data transmission in RRC_INACTIVE described in the first to third embodiments. An example of a configuration of a radio communication network according to this embodiment is similar to that shown in FIG. 1.

In this embodiment, the UE 3 in RRC_INACTIVE transmits type information indicating the type of data activity to the new gNB 1, together with UL data and an RRC (connection) resume request message. The type information may be a new IE included in the RRC (connection) resume request message (e.g., RRC Resume Request message). The name of this new IE may be, for example, a data activity IE.

The new gNB 1 according to this embodiment further receives the type information indicating the type of data activity of the UE 3 from the UE 3. If the new gNB 1 receives the UL data from the UE 3 together with the RRC Resume Request message and the UE context of the UE 3 is not available in the new gNB 1, then the new gNB 1 sends a second type of control message to the old gNB 2. The second type of control message requests the old gNB 2 to provide the UE context of the UE 3, and indicates the type of data activity of the UE 3. The second type of control message may be an improved RETRIEVE UE CONTEXT REQUEST message or a new XnAP message.

In some implementations, the type of data activity of the UE 3 may be selected from a plurality of types, including a first type in which only one UL data transmission occurs (e.g., one-shot data), a second type in which additional UL data transmission is expected to occur subsequent to the first UL data transmission (e.g., more data), and a third type in which DL data transmission is expected to occur after the UL data transmission (e.g., expect DL data). The data activity may also be referred to as data pattern or traffic pattern.

In some implementations, the old gNB 2 may determine whether or not to send the (first) UL data of the UE 3 that is in RRC_INACTIVE to the core network (i.e., 5GC) via the old gNB 2, by considering the type of data activity of the UE 3. In other words, the old gNB 2 may determine whether or not to relocate (or provide) the UE context of the UE 3 to the new gNB 1 while taking into account the type of data activity of the UE 3.

Figure 10:
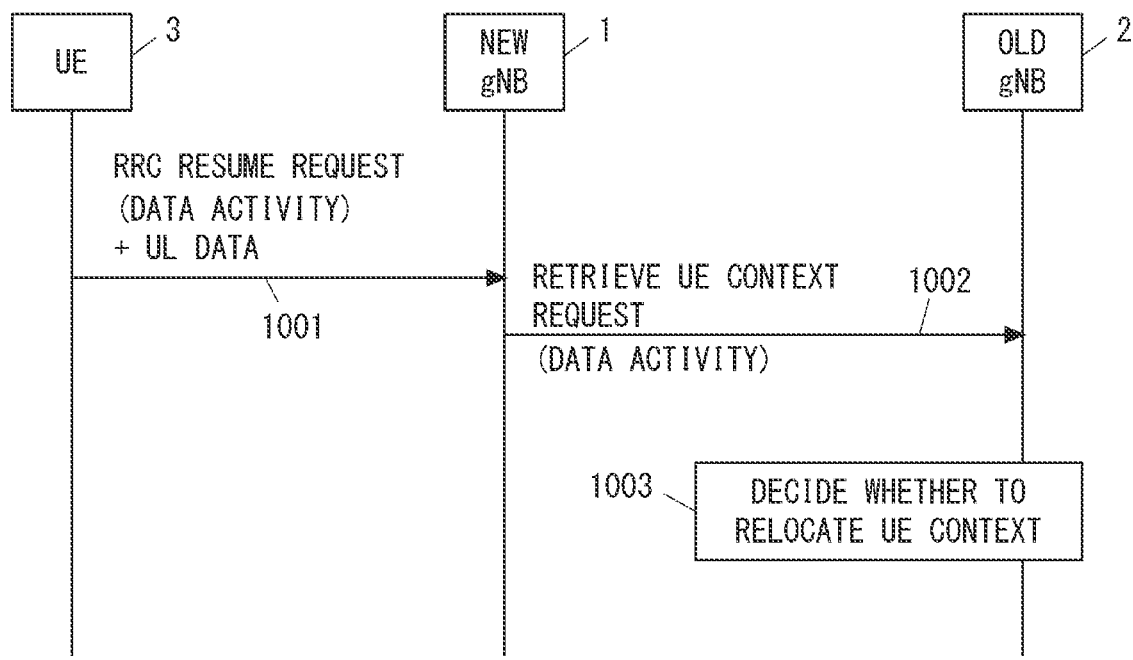
FIG. 10 is a sequence diagram showing an example of operations performed by a new gNB, old gNB, and UE according to an embodiment.

FIG. 10 shows an example of operations performed by the new gNB 1, the old gNB 2, and the UE 3. In step 1001, the UE 3 in RRC_INACTIVE transmits an RRC Resume Request message, containing an IE (e.g., Data Activity IE) indicating the type of data activity, and UL data to the new gNB 1. The RRC Resume Request message and the UL data may be transmitted in the third message of the 4-step contention based random access procedure. Alternatively, the RRC Resume Request message and the UL data may be transmitted in the first message (message A (MsgA)) of the 2-step contention based random access procedure.

In step 1002, in response to receiving the UL data together with the RRC Resume Request message, the new gNB 1 sends a RETRIEVE UE CONTEXT REQUEST message to the old gNB 2. The old gNB 2 is the last serving gNB for the UE 3. This RETRIEVE UE CONTEXT REQUEST message requests the old gNB 2 to provide the UE context of the UE 3. This RETRIEVE UE CONTEXT REQUEST message includes an information element (IE) indicating the type of data activity of the UE 3. The name of this IE may be a Data Activity IE, Data Pattern IE, or Traffic Pattern IE. This RETRIEVE UE CONTEXT REQUEST message may further include an additional information element(s) as described in the first to third embodiments. Specifically, this RETRIEVE UE CONTEXT REQUEST message may include a new IE or new cause value indicating the presence of UL data. Additionally or alternatively, this RETRIEVE UE CONTEXT REQUEST message may include a new IE or new cause value representing a request for TNL information of the old gNB 2. Additionally or alternatively, this RETRIEVE UE CONTEXT REQUEST message may include a new IE containing the UL data (i.e., DTCH data) itself.

In step 1003, the old gNB 2 determines whether or not to relocate (or provide) the UE context of the UE 3 to the new gNB 1, by considering the type of data activity of the UE 3. In other words, the old gNB 2 determines whether or not to send the (first) UL data of the UE 3 in RRC_INACTIVE to the core network (i.e., 5GC) via the old gNB 2, while taking into account the type of data activity of the UE 3.

For example, if the type of data activity of the UE 3 is the above-described first type (e.g., one-shot data), the old gNB 2 may decide to send the UL data of the UE 3 in RRC_INACTIVE to the core network (i.e., 5GC) via the old gNB 2 without relocating the UE context of the UE 3 to the new gNB 1. In contrast to this, if the type of data activity of the UE 3 is the second type (e.g., more data) or the third type (e.g., expect DL data) described above, the old gNB 2 may determine to relocate the UE context of the UE 3 to the new gNB 1.

In response to the decision not to relocate the UE context of the UE 3 to the new gNB 1, the old gNB 2 enables the UL data (and the DL data) of the UE 3 to be transferred via the old gNB 2. This operation may be similar to any of the examples described in the first to fourth embodiments.

On the other hand, in response to the decision to relocate the UE context of the UE 3 to the new gNB 1, the old gNB 2 provides the UE context of the UE 3 to the new gNB 1. In this case, the new gNB 1 receives the UE context of the UE 3 from the old gNB 2, extracts the IP data by deciphering the UL data of the UE 3 using the UE context, and sends this data directly to a core network node (i.e., UPF in 5GC) (i.e., without via the old gNB 2). Further, the new gNB 1 may receive DL data from the core network node and transmit this DL data to the UE 3. When the type of data activity of the UE 3 is the second type (e.g., more data) or the third type (e.g., expect DL data) described above, the new gNB 1 may transmit an RRC Resume message, instead of an RRC Release message, to the UE 3 in the fourth message of the 4-step random access procedure (or the second message of the 2-step random access procedure). In this case, the UE 3 may enter the RRC_CONNECTED state and perform a transfer of more UL data, or DL data, or both, with the new gNB 1.

This embodiment allows the UE 3 in RRC_INACTIVE to provide its data activity type to the new gNB 1 and further provide it to the old gNB 2 through new gNB 1. This can assist the old gNB 2 to determine whether to relocate the UE context of the UE 3.

Fifth Embodiment

This embodiment provides a modified example of the data transmission in RRC_INACTIVE described in the first to fourth embodiments. The data transmission in RRC_INACTIVE described in the first to fourth embodiments may be applied to cases of Inter-Radio Access Technology (RAT) INACTIVE mobility. More specifically, when an LTE eNB (also referred to as ng-eNB) having the capability of cooperating with the 5GS is used, this LTE eNB may support the RRC_INACTIVE state of 5G UEs. If the UE 3 in the RRC_INACTIVE state in a cell of an NR gNB selects a cell of an LTE ng-eNB (i.e., inter-RAT cell reselection), the UE 3 may stay in the cell of this ng-eNB while remaining in the RRC_INACTIVE state (i.e., without transitioning to the RRC_CONNECTED state or RRC_IDLE state).

Figure 11:
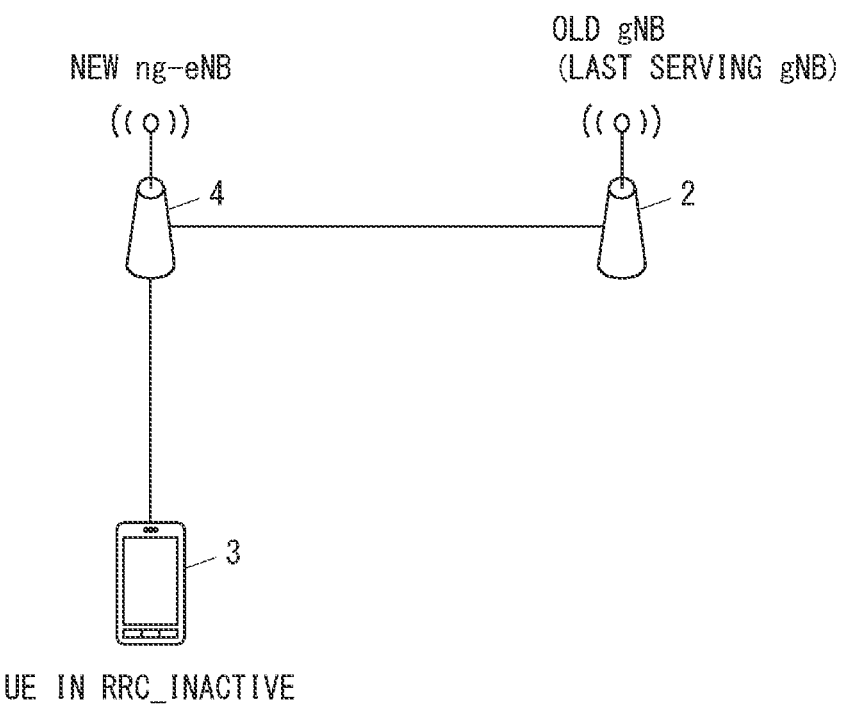
FIG. 11 shows an example of a configuration of a radio communication network according to an embodiment.
Figure 12:
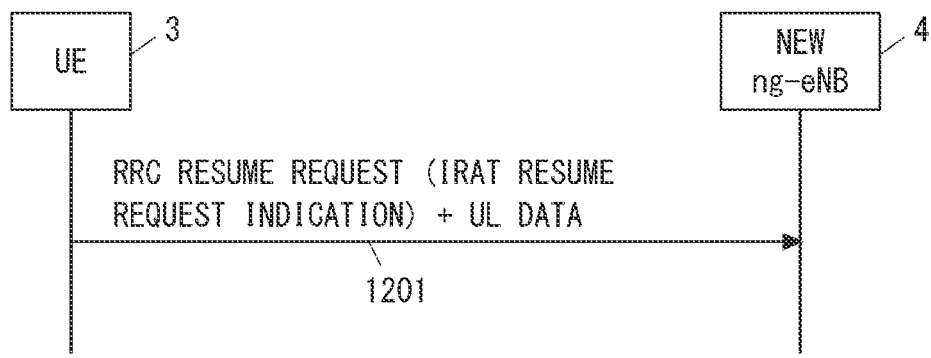
FIG. 12 is a sequence diagram showing an example of operations performed by a new gNB and UE according to an embodiment.

As shown in FIG. 11, the UE 3 may enter RRC_INACTIVE in the New Radio (NR) area (e.g., a cell of the old gNB 2), then select a cell of the ng-eNB 4 by inter-RAT cell reselection and remain in the RRC_INACTIVE state if that cell of the ng-eNB 4 is included in the RNA designated by an RRC Release message of the old gNB 2. When the UE 3 starts an RRC Resume procedure for UL data transmission, the UE 3 may transmit an RRC Resume Request message and UL data to the ng-eNB 4 in that cell of the ng-eNB 4. As shown in FIG. 12, the UE 3 may include information (IE or Cause value), in the RRC Resume Request message, that explicitly or implicitly indicates that it is an Inter-RAT resume. The ng-eNB 4 (i.e., new RAN node) may send the second type of control message (e.g., improved RETRIEVE UE CONTEXT REQUEST message or a new XnAP message) to the old gNB 2 (i.e., old RAN node or last serving RAN node) in accordance with any of the examples described in the first to fourth embodiments. Opposite to the example shown in FIG. 11, the UE 3 may enter RRC_INACTIVE in a cell of an ng-eNB (i.e., old ng-eNB), select a cell of a gNB (i.e., the new gNB), and then transmit UL data via an RRC Resume procedure in that cell of the gNB.

Further, in this embodiment, an instruction to the UE 3 to transition from the RRC_CONNECTED to the RRC_INACTIVE (e.g., SuspendConfig IE in the RRC Release message) may explicitly or implicitly indicate whether the UE 3 is eligible to perform Inter-RAT INACTIVE mobility (i.e., whether the UE 3 is allowed to perform it). To indicate this implicitly, the instruction may indicate that cells or RAN area codes (ranac) of a different RAT (e.g., LTE) are included in the RNA. Additionally or alternatively, the UE 3 may do so if a cell of the target RAT (e.g., LTE ng-eNB) explicitly or implicitly indicates that Inter-RAT INACTIVE mobility is allowed.

Figure 13:
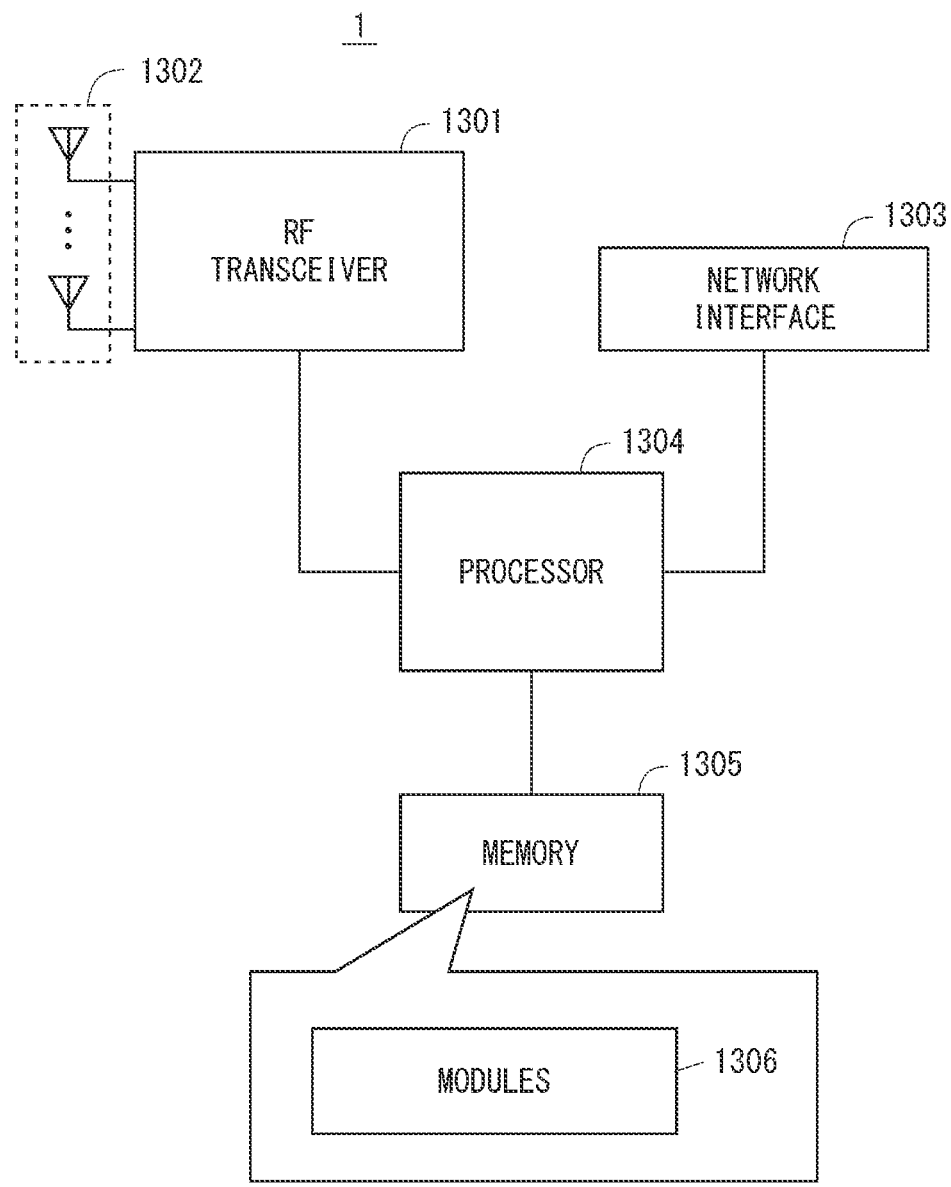
FIG. 13 is a block diagram showing an example of a configuration of a gNB according to an embodiment.

The following provides configuration examples of the gNB 1, the gNB 2, the UE 3, and the ng-eNB 4 according to the above-described embodiments. FIG. 13 is a block diagram showing a configuration example of the gNB 1 according to the above-described embodiments. Note that configuration examples of the gNB 2 and the ng-eNB 4 may be similar to that shown in FIG. 13. As shown in FIG. 13, the gNB 1 includes a Radio Frequency (RF) transceiver 1301, a network interface 1303, a processor 1304, and a memory 1305. The RF transceiver 1301 performs analog RF signal processing to communicate with UEs including the UE 3. The RF transceiver 1301 may include a plurality of transceivers. The RF transceiver 1301 is connected to an antenna array 1302 and the processor 1304. The RF transceiver 1301 receives modulated symbol data from the processor 1304, generates a transmission RF signal, and supplies the generated transmission RF signal to the antenna 1302. Further, the RF transceiver 1301 generates a baseband reception signal based on a reception RF signal received by the antenna 1302 and supplies this signal to the processor 1304. The RF transceiver 1301 may include an analog beam former circuit for beam forming. The analog beam former circuit includes, for example, a plurality of phase shifters and a plurality of power amplifiers.

The network interface 1303 is used to communicate with a network node (e.g., other gNBs, AMF, and User Plane Function (UPF)). The network interface 1303 may include a network interface card (NIC) conforming to IEEE 802.3 series.

The processor 1304 performs digital baseband signal processing (i.e., data-plane processing) and control-plane processing for radio communication. The processor 1304 may include a plurality of processors. The processor 1304 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing.

For example, the digital baseband signal processing by the processor 1304 may include signal processing in a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing by the processor 1304 may include processing of Non-Access Stratum (NAS) messages, RRC messages, MAC CEs, and DCIs.

The processor 1304 may include a digital beam former module for beam forming. The digital beam former module may include a Multiple Input Multiple Output (MIMO) encoder and a MIMO pre-coder.

The memory 1305 is a volatile memory, a nonvolatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1305 may include a storage located separately from the processor 1304. In this case, the processor 1304 may access the memory 1305 through the network interface 1303 or an I/O interface (not shown).

The memory 1305 may store one or more software modules (computer programs) 1306 including a set of instructions and data for performing the processing by the gNB 1 described in the above embodiments. In some implementations, the processor 1304 may load the software module(s) 1306 from the memory 1305 and execute the loaded software modules, thereby performing the processing of the gNB 1 described in the above embodiments.

Note that when the gNB 1 is a gNB Central Unit (gNB-CU) in a cloud RAN (C-RAN) deployment, the gNB 1 may not include the RF transceiver 1301 (and the antenna array 1302).

Figure 14:
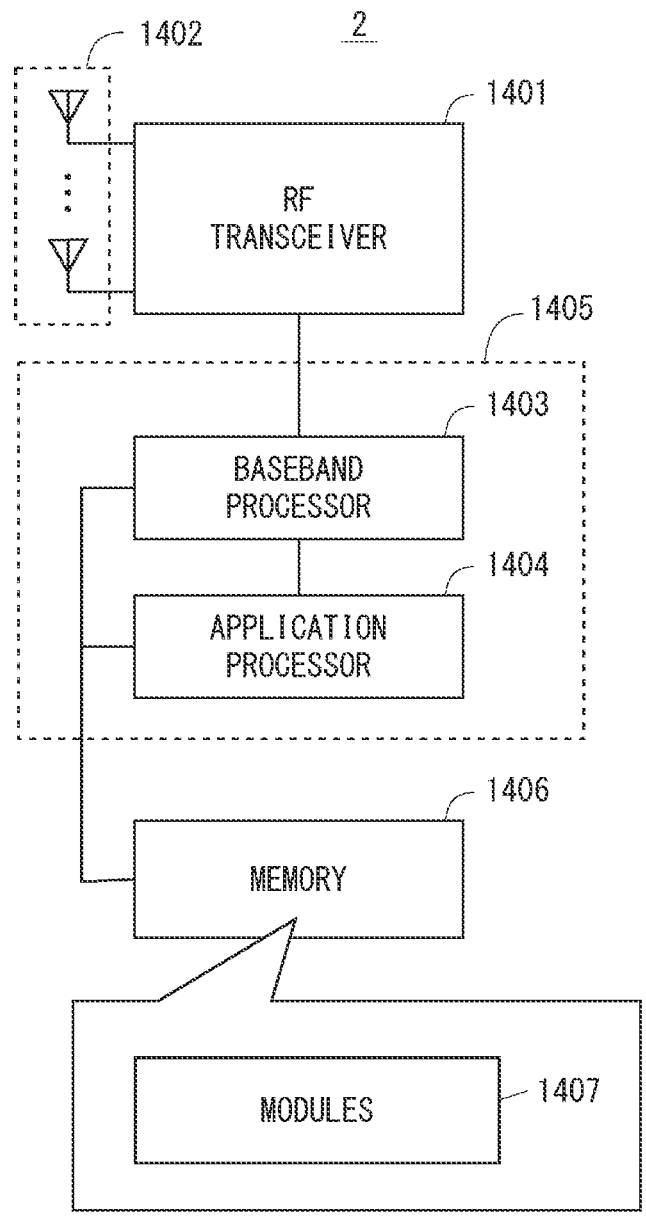
FIG. 14 is a block diagram showing an example of a configuration of a UE according to an embodiment.

FIG. 14 is a block diagram showing an example of a configuration of the UE 3. The Radio Frequency (RF) transceiver 1401 performs analog RF signal processing to communicate with NG-RAN nodes (e.g., the gNB 1, the gNB 2, and the ng-eNB 4). The RF transceiver 1401 may include a plurality of transceivers. The analog RF signal processing performed by the RF transceiver 1401 includes frequency up-conversion, frequency down-conversion, and amplification. The RF transceiver 1401 is connected to an antenna array 1402 and the baseband processor 1403. The RF transceiver 1401 receives modulated symbol data (OFDM symbol data) from the baseband processor 1403, generates a transmission RF signal, and supplies the generated transmission RF signal to the antenna 1402. Further, the RF transceiver 1401 generates a baseband reception signal based on a reception RF signal received by the antenna 1402 and supplies this signal to the baseband processor 1403. The RF transceiver 1401 may include an analog beam former circuit for beam forming. The analog beam former circuit includes, for example, a plurality of phase shifters and a plurality of power amplifiers.

The baseband processor 1403 performs a digital baseband signal processing for radio communication (a data-plane process) and a control-plane process. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1403 may include, for example, signal processing of a Service Data Adaptation Protocol (SDAP) layer, Packet Data Convergence Protocol (PDCP) layer, Radio Link Control (RLC) layer, Medium Access Control (MAC) layer, and Physical (PHY) layer. Further, the control-plane processing performed by the baseband processor 1403 may include processing of Non-Access Stratum (NAS) protocols, Radio Resource Control (RRC) protocols, and MAC Control Elements (CEs).

The baseband processor 1403 may perform Multiple Input Multiple Output (MIMO) encoding and precoding for beam forming.

The baseband processor 1403 may include a modem-processor (e.g., a Digital Signal Processor (DSP)) that performs the digital baseband signal processing and a protocol-stack-processor (e.g., a Central Processing Unit (CPU), or a Micro Processing Unit (MPU)) that performs the control-plane processing. In this case, the protocol stack processor, which performs the control-plane processing, may be integrated with an application processor 1404 described in the following.

The application processor 1404 is also referred to as a CPU, an MPU, a microprocessor, or a processor core. The application processor 1404 may include a plurality of processors (or a plurality of processor cores). The application processor 1404 loads a system software program (Operating System (OS)) and various application programs (e.g., a call application, a WEB browser, a mailer, a camera operation application, and a music player application) from a memory 1406 or from another memory (not illustrated) and executes these programs, thereby providing various functions of the UE 3.

In some implementations, as represented by a dashed line (1405) in FIG. 14, the baseband processor 1403 and the application processor 1404 may be integrated on a single chip. In other words, the baseband processor 1403 and the application processor 1404 may be implemented in a single System on Chip (SoC) device 1405. An SoC device may be referred to as a Large-Scale Integration (LSI) or a chipset.

The memory 1406 is a volatile memory, a nonvolatile memory, or a combination thereof. The memory 1406 may include a plurality of memory devices that are physically independent from each other. The volatile memory is, for example, a Static Random Access Memory (SRAM), a Dynamic RAM (DRAM), or a combination thereof. The memory 1406 may include, for example, an external memory device that can be accessed from the baseband processor 1403, the application processor 1404, and the SoC 1405. The memory 1406 may include an internal memory device that is integrated in the baseband processor 1403, the application processor 1404, or the SoC 1405. Further, the memory 1406 may include a memory in a Universal Integrated Circuit Card (UICC).

The memory 1406 may store one or more software modules (computer programs) 1407 including a set of instructions and data for performing the processing by the UE 3 described in the above embodiments. In some implementations, the baseband processor 1403 or the application processor 1404 may load these software modules 1407 from the memory 1406 and execute the loaded software modules, thereby performing the processing of the UE 3 described in the above embodiments with reference to the drawings.

The control-plane processing and operations performed by the UE 3 described in the above embodiments can be achieved by elements other than the RF transceiver 1401 and the antenna array 1402, i.e., achieved by the memory 1406, which stores the software modules 1407, and one or both of the baseband processor 1403 and the application processor 1404.

As described above with reference to FIGS. 13 and 14, each of the processors included in the gNB 1, gNB 2, UE 3, and ng-eNB 4 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiment

The above-described embodiments may be implemented independently of each other, or may be implemented by combining the whole or a part of two or more embodiment as appropriate.

If the 2-step random access (2-Step RA) procedure is used for the transmission of UL data (DTCH data) by the UE 3 in the above-described embodiments, a fallback to the 4-step random access (4-Step RA) procedure may be performed. Specifically, the UE 3 transmits UL data with an RRC (connection) resume request message (e.g., RRC Resume Request message) in the first message (MsgA) of the 2-Step RA procedure. The new gNB 1 may transmit a random access response (fallback RAR) to the UE 3 in the second message (MsgB) of the 2 Step RA procedure, indicating a notification of fallback to the 4-Step RA procedure, if the new gNB 1 has successfully detected the random access preamble of the first message (MsgA) but failed in correctly deciphering the data (payload) of the first message (MsgA). Upon receiving the fallback notification to the 4-Step RA procedure, the UE 3 transmits the same RRC (connection) resume request message and UL data in the third message (Msg3) of the 4-Step RA procedure as it sent in the first message (MsgA) of the 2-Step RA procedure. After that, the new gNB 1, old gNB 2, and UE 3 may perform the same operations as those using the 4-Step RA procedure in the embodiments described above.

The transmission of UL data (DTCH data) by the UE 3 in the above embodiments is performed while the UE 3 remains in the RRC_INACTIVE state. More specifically, this may be performed as follows. When the UE 3 receives an RRC Release message containing an instruction (SuspendConfig) to transition from the RRC_CONNECTED state to the RRC_INACTIVE state, the UE 3 stores the UE context. This UE context is also referred to as UE Access Stratum (AS) context or UE Inactive AS context. The UE context includes, for example, the current security information, the cell identifier (cellIdentity, PCI) of the serving cell (PCell), the C-RNTI assigned to the UE 3, and the information about an association between IP data (QoS flow(s)) and DRB(s) of the SDAP layer (i.e., QoS flow to DRB mapping rule). Furthermore, the UE 3 may determine whether the RRC Release message (e.g., SuspendConfig) contains information indicating that the UL data transmission in the RRC_INACTIVE state is allowed. Then, if the higher layer (Non-access stratum (NAS) layer) of the UE 3 notifies the RRC layer (AS layer) that there is data to be transmitted while the UE 3 is in the RRC_INACTIVE state, the RRC layer of the UE 3 determines whether the UL data transmission in the RRC_INACTIVE state has been allowed or not. In addition, the UE 3 may determine whether it is allowed (or supported) in the serving cell (camping cell in RRC_INACTIVE state). If the UE 3 is allowed to transmit UL data in the RRC_INACTIVE state (and if it is also allowed in the serving cell), the UE 3 retrieves necessary information from the stored UE context and initiates an RRC (connection) resume request procedure. When the RRC (connection) resume request procedure is performed by the 4-step random access (4-Step RA) procedure, the UE 3 transmits the UL data in the third message (Msg3), whereas when it is performed by the 2-step random access (2-Step RA) procedure, the UE 3 transmits the UL data in the data part of the first message (MsgA payload). The RRC Resume Request message, which is transmitted together with the UL data, may contain a Cause value (e.g. UL-data-Inactive, mo-Data-Inactive) indicating that it involves UL data transmission (or that its purpose is to transmit UL data). Then, the UE 3 remains in the RRC_INACTIVE state when it receives an RRC Release message in response to the RRC Resume Request message. At this time, the UE 3 replaces (i.e., overwrites) a part of the stored UE context with configuration information contained in the RRC Release message (e.g. SuspendConfig IE). This configuration information may include, for example, RAN area information (e.g., ran-NotificationAreaInfo) and security information (e.g., nextHopChainingCount). Further, this configuration information may include information indicating whether to allow the UE 3 to transmit data in the RRC Resume (in other words, whether the UE 3 is allowed to do so). This information may further indicate which of the one or more DRBs configured in the UE 3 is allowed to be used to transmit data in the RRC Resume. This allows the UE 3 to send UL data while remaining in the RRC_INACTIVE state in the serving cell where the UE 3 stays at the time when the UL data occurs again. On the other hand, if the UE 3 receives an RRC Resume message in response to the RRC Resume Request message, the UE 3 enters the RRC_CONNECTED state.

As described in the above embodiments, the IP address of the old gNB 2 used to transfer GTP-U/UDP/IP packets on the Xn-U interface (GTP-U tunnel) may be the same as the IP address of the old gNB 2 used to transfer XnAP/SCTP/IP packets on the Xn-C interface (XnAP protocol). The old gNB 2 may signal in advance with the new gNB 1 and inform the new gNB 1 that the same IP address will be used for both the Xn-U interface and the Xn-C interface.

Similarly, the IP address of the new gNB 1 used to transfer GTP-U/UDP/IP packets on the Xn-U interface (GTP-U tunnel) may be the same as the IP address of the new gNB 1 used to transfer XnAP/SCTP/IP packets on the Xn-C interface (XnAP protocol). The new gNB 1 may signal in advance with the old gNB 2 and inform the old gNB 2 that the same IP address will be used for both the Xn-U interface and the Xn-C interface.

The above-described embodiments may be implemented in LTE. Specifically, the embodiments described above may be applied to a case where the UE 3 transmits UL data while remaining in the RRC_INACTIVE state in a cell of an LTE eNB (or an advanced version thereof) connected to an EPC (or an advanced version thereof). More specifically, when the new eNB receives UL data together with an RRC (connection) resume request message from the UE 3, and the UE context of the UE 3 is not available in the new eNB, the new eNB sends the second type of control message to the old eNB through the X2 interface. The old eNB determines whether to send the UL data via the old eNB to the core network (i.e. EPC) or to send the UE context to the new eNB. If the old eNB decides to transmit the UL data to the core network via the old eNB, it may send TNL information of the old eNB to the new eNB. In response to this, the new eNB may send the UL data to the old eNB. This allows the UL data to be transmitted to the core network without transferring the UE context of the UE 3 from the old eNB to the new eNB.

The operations performed by the new gNB 1 (or new ng-eNB 4), old gNB 2, and UE 3 described in the above embodiments may be performed in cell reselection (also referred to as intra-RAT inter-system cell reselection) between a cell of an LTE eNB and a cell of an ng-eNB performed by a UE, and may be performed in inter-RAT cell reselection between a cell of an LTE eNB and a cell of a gNB. For example, the operations of the new gNB 1 (or new ng-eNB 4) and old gNB 2 described in the above embodiments may be implemented between an LTE eNB and an ng-eNB, or between an LTE eNB and a gNB.

The above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)
A first Radio Access Network (RAN) node comprising:
at least one memory; and
at least one processor coupled to the at least one memory and configured to:

if a Radio Resource Control (RRC) resume request message not accompanied by uplink data is received from a radio terminal in an RRC_INACTIVE state and a radio terminal context of the radio terminal is not available in the first RAN node, send a first type of control message requesting the radio terminal context to a second RAN node that is a last serving RAN node for the radio terminal; and if the uplink data together with the RRC resume request message is received from the radio terminal in the RRC_INACTIVE state and the radio terminal context is not available in the first RAN node, send to the second RAN node a second type of control message that requests the radio terminal context and is distinct from the first type of control message.

(Supplementary Note 2)
The first RAN node according to Supplementary Note 1, wherein the second type of control message is distinguished from the first type of control message by the fact that the second type of control message includes an indication indicating directly or indirectly presence of the uplink data.

(Supplementary Note 3)
The first RAN node according to Supplementary Note 1, wherein the second type of control message is distinguished from the first type of control message by the fact that the second type of control message includes an indication representing a request for transport network layer (TNL) information of the second RAN node.

(Supplementary Note 4)
The first RAN node according to any one of Supplementary Notes 1 to 3, wherein the at least one processor is configured to:
receive a third control message from the second RAN node after sending the second type of control message; and
send the uplink data to the second RAN node in response to the third control message indicating that the radio terminal context will not be relocated.

(Supplementary Note 5)
The first RAN node according to any one of Supplementary Notes 1 to 3, wherein the at least one processor is configured to:
receive a third control message from the second RAN node after sending the second type of control message; and
send the uplink data to the second RAN node in response to the third control message indicating permission for an uplink data transfer via the second RAN node.

(Supplementary Note 6)
The first RAN node according to any one of Supplementary Notes 1 to 3, wherein the at least one processor is configured to send the uplink data to the second RAN node in response to receiving from the second RAN node, after sending the second type of control message, a third control message indicating transport network layer (TNL) information of the second RAN node.

(Supplementary Note 7)
The first RAN node according to Supplementary Note 1, wherein the second type of control message is distinguished from the first type of control message by the fact that the second type of control message contains the uplink data itself.

(Supplementary Note 8)
The first RAN node according to Supplementary Note 7, wherein the at least one processor is configured to include, in the second type of control message, additional information needed to identify or decipher the uplink data.

(Supplementary Note 9)
The first RAN node according to Supplementary Note 8, wherein the additional information includes one or both of a data radio bearer identifier and a logical channel identifier.

(Supplementary Note 10)
The first RAN node according to any one of Supplementary Notes 1 to 9, wherein the at least one processor is configured to:
  receive type information indicating a type of data activity together with the uplink data from the radio terminal; and
  inform the second RAN node of the type of the data activity via the second type of control message.

(Supplementary Note 11)
The first RAN node according to Supplementary Note 10, wherein the type of the data activity is selected from a plurality of types, including a first type in which only transmission of the uplink data occurs, a second type in which additional uplink data transmission is expected to occur subsequent to the transmission of the uplink data, and a third type in which downlink data transmission is expected to occur after the transmission of the uplink data.

(Supplementary Note 12)
The first RAN node according to any one of Supplementary Notes 1 to 11, wherein the at least one processor is configured to include, in the second type of control message, transport network layer (TNL) information of the first RAN node.

(Supplementary Note 13)
A second Radio Access Network (RAN) node comprising:
  at least one memory; and
  at least one processor coupled to the at least one memory and configured to:
    store a radio terminal context of a radio terminal that is in a Radio Resource Control (RRC)_INACTIVE state;
    receive a control message requesting the radio terminal context from a first RAN node; and
    determine whether or not the control message is of a particular type that is used when the first RAN node has received uplink data together with an RRC resume request message from the radio terminal in the RRC_INACTIVE state.

(Supplementary Note 14)
The second RAN node according to Supplementary Note 13, wherein the particular type is distinguished from another type by the fact that the control message includes an indication indicating directly or indirectly presence of the uplink data.

(Supplementary Note 15)
The second RAN node according to Supplementary Note 13, wherein the particular type is distinguished from another type by the fact that the control message includes an indication representing a request for transport network layer (TNL) information of the second RAN node.

(Supplementary Note 16)
The second RAN node according to Supplementary Note 13, wherein the particular type is distinguished from another type by the fact that the control message contains the uplink data itself.

(Supplementary Note 17)
The second RAN node according to any one of Supplementary Notes 13 to 16, wherein the at least one processor is configured to, if the control message is of the particular type, send the uplink data to the core network via the second RAN node without providing the radio terminal context to the first RAN node.

(Supplementary Note 18)
The second RAN node according to any one of Supplementary Notes 13 to 17, wherein the at least one processor is configured to, if the control message is of the particular type, determine whether or not to send the uplink data to the core network via the second RAN node.

(Supplementary Note 19)
The second RAN node according to Supplementary Note 18, wherein the at least one processor is configured to determine whether or not to send the uplink data to the core network via the second RAN node, by considering a type of data activity of the radio terminal indicated by the control message.

(Supplementary Note 20)
The second RAN node according to Supplementary Note 19, wherein the type of the data activity is selected from a plurality of types, including a first type in which only transmission of the uplink data occurs, a second type in which additional uplink data transmission is expected to occur subsequent to the transmission of the uplink data, and a third type in which downlink data transmission is expected to occur after the transmission of the uplink data.

(Supplementary Note 21)
The second RAN node according to any one of Supplementary Notes 18 to 20, wherein the at least one processor is configured to send a control message indicating transport network layer (TNL) information of the second RAN node to the first RAN node in response to a decision to send the uplink data to the core network via the second RAN node.

(Supplementary Note 22)
The second RAN node according to any one of Supplementary Notes 18 to 20, wherein the at least one processor is configured to, in response to a decision to send the uplink data to the core network via the second RAN node, send to the first RAN node a control message indicating that the radio terminal context will not be relocated.

(Supplementary Note 23)
The second RAN node according to any one of Supplementary Notes 18 to 20, wherein the at least one processor is configured to, in response to a decision to send the uplink data to the core network via the second RAN node, send to the first RAN node a control message indicating permission for an uplink data transfer via the second RAN node.

(Supplementary Note 24)
A radio terminal comprising:
  at least one memory; and
  at least one processor coupled to the at least one memory and configured to:
    transmit uplink data and type information indicating a type of data activity, together with a Radio Resource Control (RRC) resume request message, to a Radio Access Network (RAN) node when the radio terminal is in an RRC_INACTIVE state.

(Supplementary Note 25)
The radio terminal according to Supplementary Note 24, wherein the at least one processor is configured to select the type of the data activity from a plurality of types, including a first type in which only transmission of the uplink data occurs, a second type in which additional uplink data transmission is expected to occur subsequent to the uplink data, and a third type in which downlink data transmission is expected to occur after the transmission of the uplink data.

(Supplementary Note 26)
The radio terminal according to Supplementary Note 24 or 25, wherein the type information is included in the RRC resume request message.

(Supplementary Note 27)

A method performed by a first Radio Access Network (RAN) node, the method comprising:
- if a Radio Resource Control (RRC) resume request message not accompanied by uplink data is received from a radio terminal in an RRC_INACTIVE state and a radio terminal context of the radio terminal is not available in the first RAN node, sending a first type of control message requesting the radio terminal context to a second RAN node that is a last serving RAN node for the radio terminal; and
- if the uplink data together with the RRC resume request message is received from the radio terminal in the RRC_INACTIVE state and the radio terminal context is not available in the first RAN node, sending to the second RAN node a second type of control message that requests the radio terminal context and is distinct from the first type of control message.

(Supplementary Note 28)

A method performed by a second Radio Access Network (RAN) node, the method comprising:
- storing a radio terminal context of a radio terminal that is in a Radio Resource Control (RRC)_INACTIVE state;
- receiving a control message requesting the radio terminal context from a first RAN node; and
- determining whether or not the control message is of a particular type that is used when the first RAN node has received uplink data together with an RRC resume request message from the radio terminal in the RRC_INACTIVE state.

(Supplementary Note 29)

A method performed by a radio terminal, the method comprising transmitting uplink data and type information indicating a type of data activity, together with a Radio Resource Control (RRC) resume request message, to a Radio Access Network (RAN) node when the radio terminal is in an RRC_INACTIVE state.

(Supplementary Note 30)

A program for causing a computer to perform a method for a first Radio Access Network (RAN) node, the method comprising:
- if a Radio Resource Control (RRC) resume request message not accompanied by uplink data is received from a radio terminal in an RRC_INACTIVE state and a radio terminal context of the radio terminal is not available in the first RAN node, sending a first type of control message requesting the radio terminal context to a second RAN node that is a last serving RAN node for the radio terminal; and
- if the uplink data together with the RRC resume request message is received from the radio terminal in the RRC_INACTIVE state and the radio terminal context is not available in the first RAN node, sending to the second RAN node a second type of control message that requests the radio terminal context and is distinct from the first type of control message.

(Supplementary Note 31)

A program for causing a computer to perform a method for a second Radio Access Network (RAN) node, the method comprising:
- storing a radio terminal context of a radio terminal that is in a Radio Resource Control (RRC)_INACTIVE state;
- receiving a control message requesting the radio terminal context from a first RAN node; and
- determining whether or not the control message is of a particular type that is used when the first RAN node has received uplink data together with an RRC resume request message from the radio terminal in the RRC_INACTIVE state.

(Supplementary Note 32)

A program for causing a computer to perform a method for a radio terminal, the method comprising transmitting uplink data and type information indicating a type of data activity, together with a Radio Resource Control (RRC) resume request message, to a Radio Access Network (RAN) node when the radio terminal is in an RRC_INACTIVE state.

This application is based upon and claims the benefit of priority from Japanese patent application No. 2020-022471, filed on Feb. 13, 2020, the disclosure of which is incorporated herein in its entirety by reference.

REFERENCE SIGNS LIST 1 gNB
2 gNB
3 UE
4 ng-eNB
1304 PROCESSOR
1305 MEMORY
1306 MODULES
1403 BASEBAND PROCESSOR
1404 APPLICATION PROCESSOR
1406 MEMORY
1407 MODULES

The invention claimed is:

1. A first Radio Access Network (RAN) node comprising:
at least one memory; and
at least one processor coupled to the at least one memory and configured to:
- if a Radio Resource Control (RRC) resume request message not accompanied by uplink data is received from a radio terminal in an RRC_INACTIVE state and a radio terminal context of the radio terminal is not available in the first RAN node, send a first type of control message requesting the radio terminal context to a second RAN node that is a last serving RAN node for the radio terminal; and
- if the uplink data together with the RRC resume request message is received, by the first RAN node, from the radio terminal in the RRC_INACTIVE state and the radio terminal context is not available in the first RAN node, then:
  - send to the second RAN node a second type of control message that requests the radio terminal context and is distinct from the first type of control message;
  - receive a third control message, from the second RAN node, after sending the second type of control message; and
  - send the uplink data, received from the radio terminal, to the second RAN node in response to the third control message indicating that the radio terminal context will not be relocated.

2. The first RAN node according to claim 1, wherein the second type of control message is distinguished from the first type of control message by the fact that the second type of control message includes an indication indicating directly or indirectly presence of the uplink data.

3. The first RAN node according to claim 1, wherein the second type of control message is distinguished from the first type of control message by the fact that the second type of control message includes an indication representing a request for transport network layer (TNL) information of the second RAN node.

4. The first RAN node according to claim 1, wherein the at least one processor is configured to:
receive a third control message from the second RAN node after sending the second type of control message; and
send the uplink data to the second RAN node in response to the third control message indicating permission for an uplink data transfer via the second RAN node.

5. The first RAN node according to claim 1, wherein the at least one processor is configured to send the uplink data to the second RAN node in response to receiving from the second RAN node, after sending the second type of control message, a third control message indicating transport network layer (TNL) information of the second RAN node.

6. The first RAN node according to claim 1, wherein the second type of control message is distinguished from the first type of control message by the fact that the second type of control message contains the uplink data itself.

7. The first RAN node according to claim 6, wherein the at least one processor is configured to include, in the second type of control message, additional information needed to identify or decipher the uplink data.

8. The first RAN node according to claim 7, wherein the additional information includes one or both of a data radio bearer identifier and a logical channel identifier.

9. The first RAN node according to claim 1, wherein the at least one processor is configured to:
receive type information indicating a type of data activity together with the uplink data from the radio terminal; and
inform the second RAN node of the type of the data activity via the second type of control message.

10. The first RAN node according to claim 9, wherein the type of the data activity is selected from a plurality of types, including a first type in which only transmission of the uplink data occurs, a second type in which additional uplink data transmission is expected to occur subsequent to the transmission of the uplink data, and a third type in which downlink data transmission is expected to occur after the transmission of the uplink data.

11. The first RAN node according to claim 1, wherein the at least one processor is configured to include, in the second type of control message, transport network layer (TNL) information of the first RAN node.

12. A radio terminal comprising:
at least one memory; and
at least one processor coupled to the at least one memory and configured to:
transmit uplink data and type information indicating a type of data activity, together with a Radio Resource Control (RRC) resume request message, to a Radio Access Network (RAN) node when the radio terminal is in an RRC_INACTIVE state,
wherein the uplink data is configured to be transmitted, from the RAN node, to another RAN node, in response to the RAN node receiving a first message indicating that a radio terminal context of the radio terminal will not be relocated.

13. The radio terminal according to claim 12, wherein the at least one processor is configured to select the type of the data activity from a plurality of types, including a first type in which only transmission of the uplink data occurs, a second type in which additional uplink data transmission is expected to occur subsequent to the uplink data, and a third type in which downlink data transmission is expected to occur after the transmission of the uplink data.

14. The radio terminal according to claim 12, wherein the type information is included in the RRC resume request message.

15. A method performed by a first Radio Access Network (RAN) node, the method comprising:
if a Radio Resource Control (RRC) resume request message not accompanied by uplink data is received from a radio terminal in an RRC_INACTIVE state and a radio terminal context of the radio terminal is not available in the first RAN node, sending a first type of control message requesting the radio terminal context to a second RAN node that is a last serving RAN node for the radio terminal; and
if the uplink data together with the RRC resume request message is received, by the first RAN node, from the radio terminal in the RRC_INACTIVE state and the radio terminal context is not available in the first RAN node, then:
sending to the second RAN node a second type of control message that requests the radio terminal context and is distinct from the first type of control message;
receiving a third control message, from the second RAN node, after sending the second type of control message; and
sending the uplink data received from the radio terminal to the second RAN node in response to the third control message indicating that the radio terminal context will not be relocated.

16. The first RAN node according to claim 1, wherein the uplink data is data other than forwarding address information.

17. The first RAN node according to claim 1, wherein the uplink data comprises user data.

18. The radio terminal according to claim 12, wherein the at least one processor is further configured to receive an RRC RELEASE message from the RAN node, and
wherein the RRC RELEASE message is included in a second message, the second message being transmitted in response to the RAN node receiving the first message.

19. The method according to claim 15, wherein the uplink data is data other than forwarding address information.

20. The method according to claim 15, wherein the uplink data comprises user data.

* * * * *